United States Patent [19]

Tsukuda et al.

[11] Patent Number: 5,590,270
[45] Date of Patent: Dec. 31, 1996

[54] METHOD AND APPARATUS FOR DETECTING A LOWER LEVEL SOFTWARE REUSABLE PRODUCT IN GENERATING AN UPPER LEVEL SOFTWARE PRODUCT FROM A LOWER LEVEL SOFTWARE PRODUCT AND CHANGING THE UPPER LEVEL SOFTWARE PRODUCT

[75] Inventors: Gunji Tsukuda, Kawasaki; Ichiro Naito, Tokyo; Hirofumi Danno, Yokohama; Kazutoshi Tamura, Yokohama; Hiroshi Tsukino, Yokohama; Hideo Kamiko, Yokohama; Hirokazu Mimura, Yokohama; Akiko Fukuya, Dazaifu; Hiroyuki Maezawa, Tama, all of Japan

[73] Assignees: Hitachi, Ltd.; Hitachi System Engineering, Ltd., both of Tokyo; Hitachi Software Engineering Co. Ltd., Yokohama, all of Japan

[21] Appl. No.: 392,025

[22] Filed: Feb. 21, 1995

Related U.S. Application Data

[63] Continuation of Ser. No. 791,484, Nov. 12, 1991, abandoned.

[30] Foreign Application Priority Data

Nov. 14, 1990 [JP] Japan .................................. 2-308297

[51] Int. Cl.⁶ .............................. G06F 17/50; G06F 17/30
[52] U.S. Cl. ........................................................ 395/701
[58] Field of Search ............................. 382/113; 364/191, 364/286, 280.7, 261, 280.1; 395/161, 600

[56] References Cited

U.S. PATENT DOCUMENTS 4,028,538  6/1977  Olander, Jr. et al. ............... 364/709.16
4,366,553  12/1982  Spangler et al. ......................... 395/375
4,742,467  5/1988  Messerich et al. ...................... 395/700

(List continued on next page.)

FOREIGN PATENT DOCUMENTS 1-237726  9/1989  Japan .

OTHER PUBLICATIONS

Lawson, H. W., "Philosophies for Engineering Computer-Based Systems", Computer Magazine, vol. 23 No. 12, pp. 52–63 Dec. 1990.

Parker T. "A Baker's Dozen CASE Tools for PCs and Workstations.", Computer Language, vol. 6, No. 1, pp. 91–106.

(List continued on next page.)

Primary Examiner—Thomas G. Black
Assistant Examiner—Jack M. Choules
Attorney, Agent, or Firm—Fay, Sharpe, Beall, Fagan, Minnich & McKee

[57] ABSTRACT

A reverse engineering method for supporting software reuse in generating an upper level software product from a lower level software product allowing the reuse of some software product's among multi-level software products ranging from an upper level data flow to a lower level job flow. The method includes the steps of: generating an upper level software product using a lower level software product; generating relational information between the lower and upper level software products; inputting a request for changing the upper level software product via an input/output interface; changing the upper level software product in response to the change request; and detecting a reusable field of the lower level software product which is not to be changed, in response to a change of the upper level software product. A pair of the lower level software product and the upper level software product comprise an internal design and an external design which is higher in level than coded programs and an external design and detailed requirements a user supplied. Information representative of a reusable field with no change and a field that is not reusable which requires a change of the lower level software product, may be provided. The information is obtained by comparing the upper level software product with the lower level software product.

9 Claims, 34 Drawing Sheets

U.S. PATENT DOCUMENTS

| | | | |
|---|---|---|---|
| 4,796,179 | 1/1989 | Lehman et al. | 364/191 |
| 4,809,170 | 2/1989 | Leblang et al. | 395/700 |
| 4,831,580 | 5/1989 | Yamada | 395/133 |
| 4,860,203 | 8/1989 | Corrigan et al. | 395/700 |
| 4,870,397 | 9/1989 | Soto et al. | 395/133 |
| 4,949,253 | 8/1990 | Chigira et al. | 395/500 |
| 5,133,063 | 7/1992 | Naito et al. | 395/500 |
| 5,187,788 | 2/1993 | Marmelstein | 395/700 |
| 5,204,960 | 4/1993 | Smith et al. | 395/700 |
| 5,230,050 | 7/1993 | Iisuka et al. | 395/700 |
| 5,233,513 | 8/1993 | Doyle | 364/401 |
| 5,287,488 | 2/1994 | Sakata et al. | 395/500 |
| 5,325,531 | 6/1994 | McKeeman et al. | 395/700 |
| 5,446,911 | 8/1995 | Juso et al. | 395/600 |

OTHER PUBLICATIONS

Rajlich et al, "Visual Support For Programming-in-the-Large", Oct. 1988, pp. 92–99.

Benedusi et al, "A Reverse Engineering Methodology . . . for Software Maintenance", Oct. 1989, pp. 180–189.

Marmelstein, "The Apex Design System", May 1989, pp. 521–527.

Rosemary Rock–Evans, et al., "Reverse Engineering: Markets, Methods, and Tools", vol. 1, Ovum, Ltd., 1990, pp. 3–33. (Provided in English).

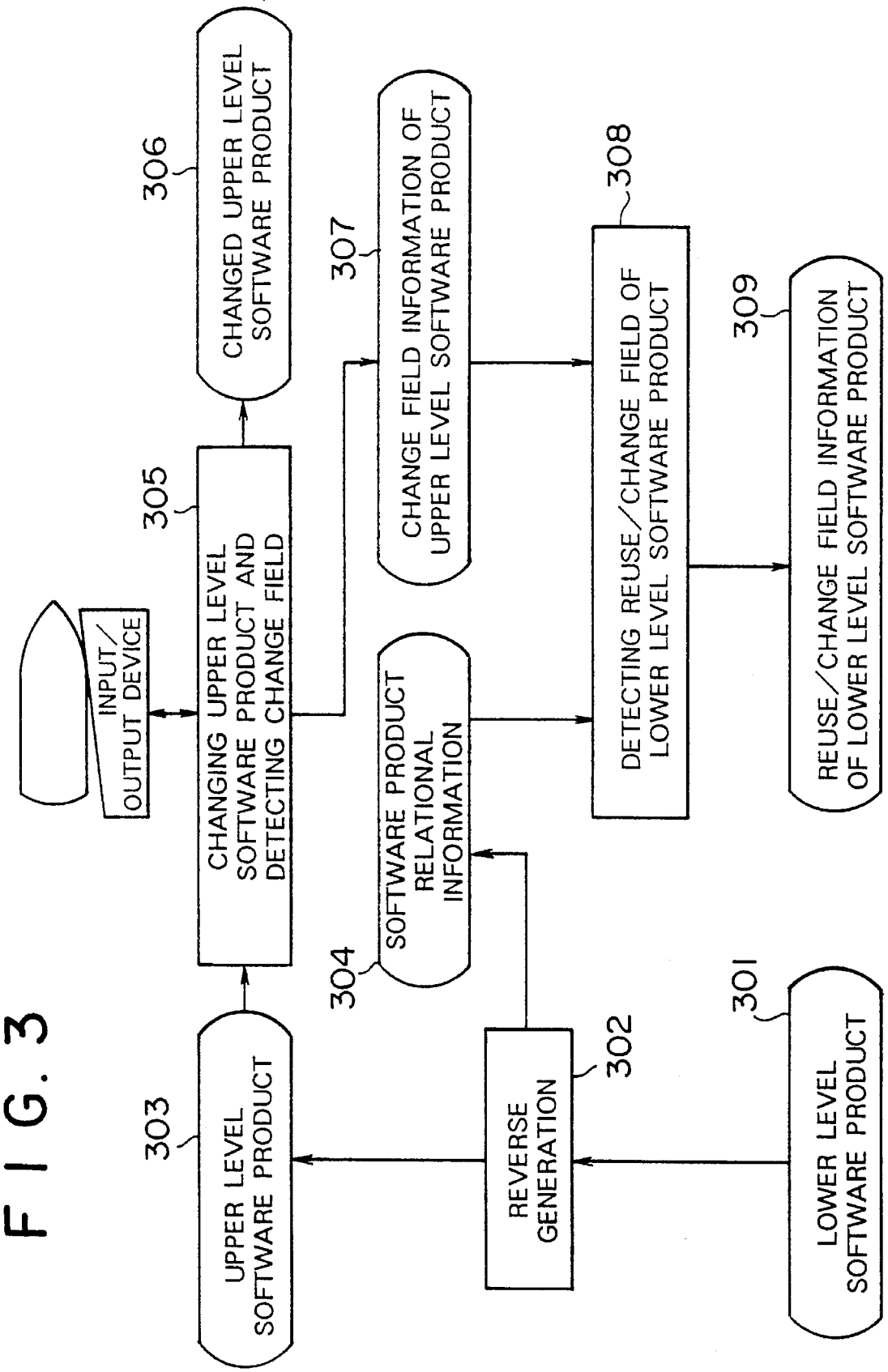

FIG. 5A

| SHEET NAME | SYSTEM FLOW | JOB NAME | JOB 1 | |
|---|---|---|---|---|
| PROGRAM NAME | | INPUT FILE NAME | OUTPUT FILE NAME | |
| PROG 1 | | A | A' | |
| PROG 2 | | A' | B | |

FIG. 5B

| SHEET NAME | SYSTEM FLOW 2 | JOB NAME | JOB 2 |
|---|---|---|---|
| PROGRAM NAME | | INPUT FILE NAME | OUTPUT FILE NAME |
| PROG 3 | | B | B' |
| PROG 4 | | B' | C |

FIG. 5C

SYSTEM FLOW 3

| SHEET NAME | JOB NAME | JOB 3 | |
|---|---|---|---|
| PROGRAM NAME | INPUT FILE NAME | OUTPUT FILE NAME | |
| PROG 3 | D | D' | |
| PROG 4 | D' | B | |

FIG. 6

| SHEET NAME | DFD 1 | PROJECT NAME | PRJCT 1 |
|---|---|---|---|
| JOB NAME | INPUT FILE NAME | | OUTPUT FILE NAME |
| JOB 1 | A | | B |
| JOB 2 | B | | C |
| JOB 3 | D | | B |

FIG. 11

| SHEET NAME | JOB NAME | ATTRIB-UTE | INPUT FILE NAME | ATTRIB-UTE | OUTPUT FILE NAME | ATTRIB-UTE |
|---|---|---|---|---|---|---|
| DFD1 | JOB1 | | | | | |
| DFD1 | JOB2 | | | | | |
| DFD1 | JOB3 | | | | | |

FIG. 15

| SHEET NAME | DFD 1 | PROJECT NAME | GYOMU 1 |
|---|---|---|---|
| JOB 1 | A | | B |
| JOB 3 | D | | B, E |
| JOB 4 | E | | F |

1501 — DFD 1
1502 — GYOMU 1
1503 — SHEET NAME column
1504 — data rows
1505 — header area F I G. 16
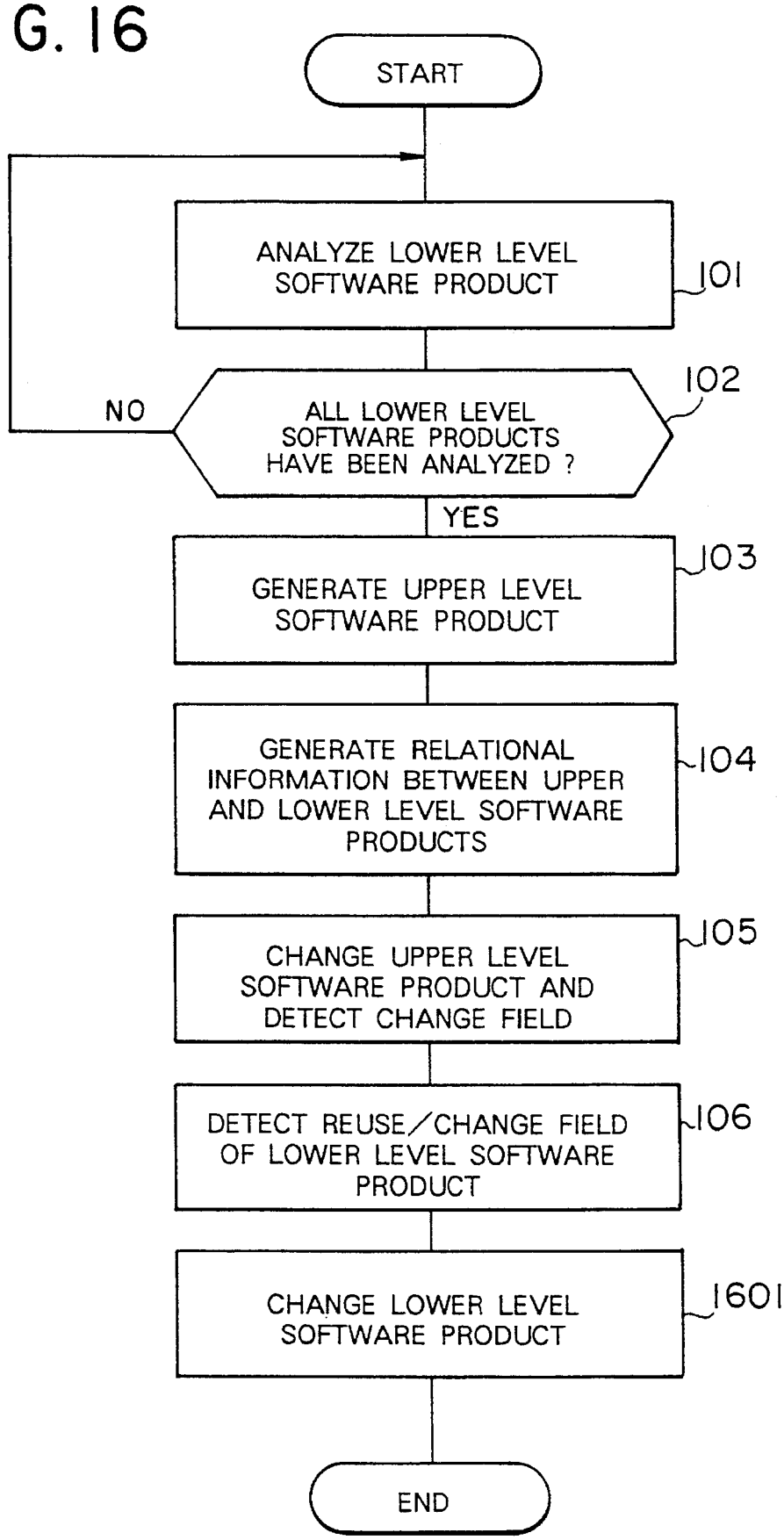

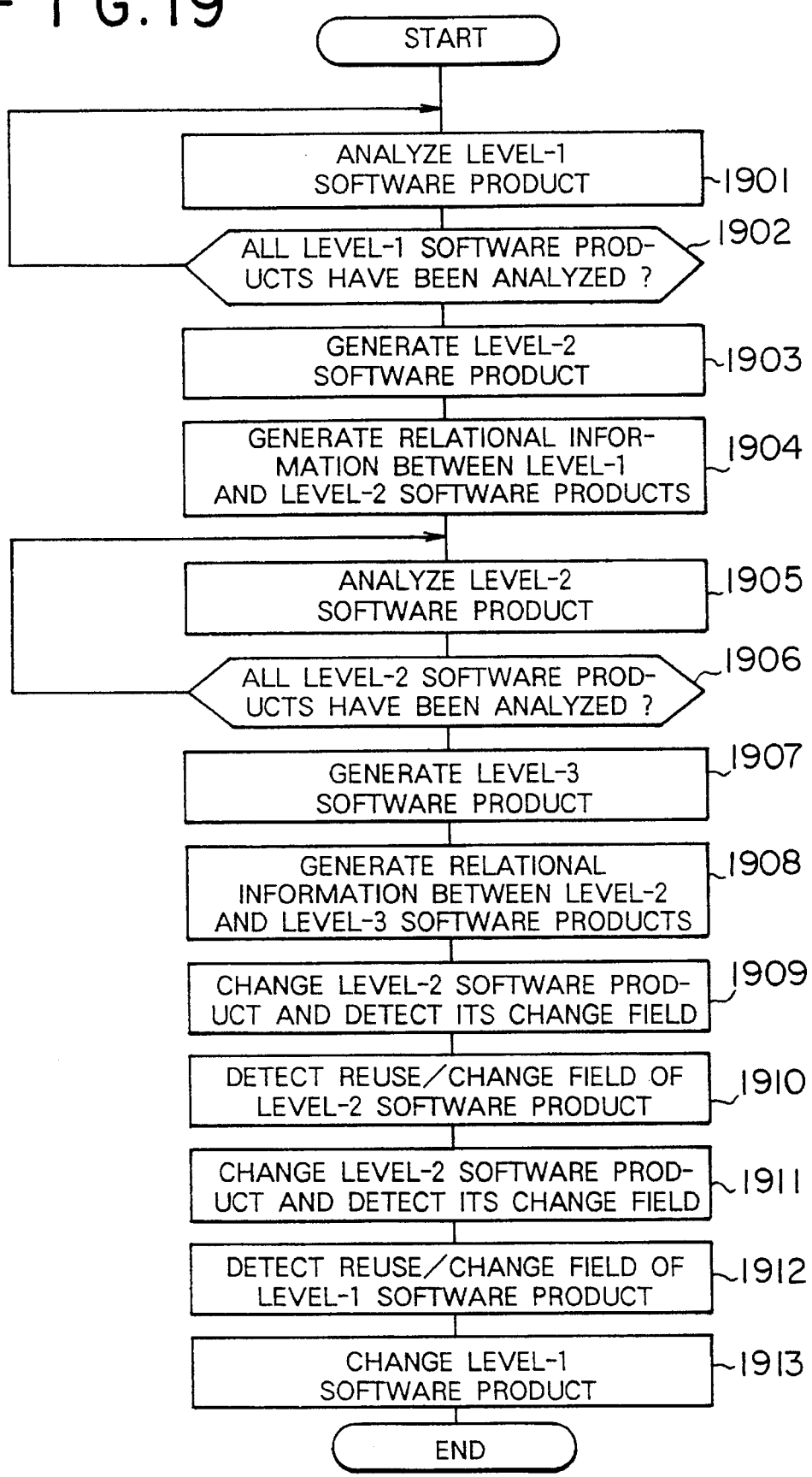

FIG. 23B

| SHEET NAME | PROGRAM SPECIFICATION 6 | RELATED PROGRAM |
|---|---|---|
| PROGRAM NAME | PROG 6 | |
| PROCESS OUTLINE | | PROCESS DETAILS |
| RELATED FILE<br>D´ : INPUT<br>B : OUTPUT | | |
| RELATED TABLE | TBL 6 | |
| RELATED PATTERN | PAT 6 | |

FIG. 24A

| SHEET NAME | PROGRAM SPECIFICATION 5 | | |
|---|---|---|---|
| PROGRAM NAME | PROG 5 | | |
| FILE NAME | D | ATTRIBUTE | INPUT |
| FILE NAME | D′ | ATTRIBUTE | OUTPUT |

FIG. 24B

| SHEET NAME | PROGRAM SPECIFICATION 6 | | |
|---|---|---|---|
| PROGRAM NAME | PROG 6 | | |
| FILE NAME | D′ | ATTRIBUTE | INPUT |
| FILE NAME | B | ATTRIBUTE | OUTPUT |

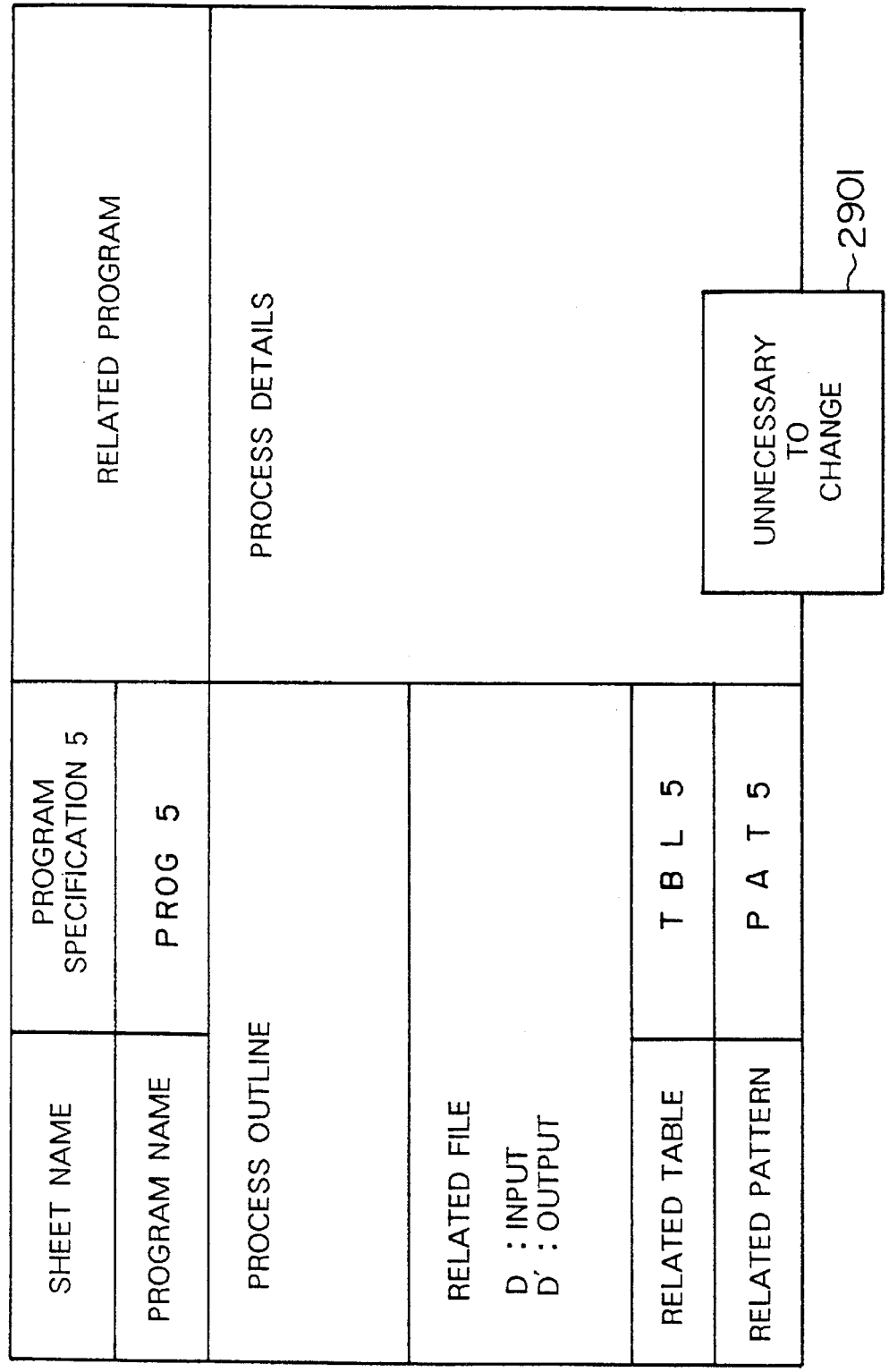

FIG. 29B

| SHEET NAME | PROGRAM SPECIFICATION 6 | | |
|---|---|---|---|
| PROGRAM NAME | PROG 6 | | |
| PROCESS OUTLINE | | | |
| RELATED FILE | D : INPUT<br>D' : OUTPUT<br>E : OUTPUT | | |
| RELATED TABLE | TBL 6 | | |
| RELATED PATTERN | PAT 6 | | |
| PROCESS DETAILS | | RELATED PROGRAM | |

2902: AUTOMATIC ADDITION OF OUTPUT FILE E AS RELATED FILE

CHANGE OTHER ELEMENTS IF NECESSARY

METHOD AND APPARATUS FOR DETECTING A LOWER LEVEL SOFTWARE REUSABLE PRODUCT IN GENERATING AN UPPER LEVEL SOFTWARE PRODUCT FROM A LOWER LEVEL SOFTWARE PRODUCT AND CHANGING THE UPPER LEVEL SOFTWARE PRODUCT

This is a continuation of U.S. application Ser. No. 07/791,484 filed Nov. 12, 1991, now abandoned.

CROSS REFERENCE TO RELATED BACKGROUND ARTS

Reference is made to a U.S. Pat. Nos. 4,796,179, 4,860,203 and 4,831,580, a Japanese Patent Laid-open Publication JP-A-1-237726 and R. Rock-Evance and K. Hales, "Reverse Engineering: Markets, Methods and Tools", Vol. 1, Ovum Ltd., 1990, pp. 3 to 33. These background arts describe software reuse or reengineering between external and internal designs, i.e., between upper and lower level specifications.

BACKGROUND OF THE INVENTION

1. Field of the Invention

The present invention relates to a method of supporting reuse of already developed software products when developing new software products with high efficiency and high productivity.

2. Description of Related Background Art

As a means of improving software productivity, there is a method of developing a new system by reusing at least a part of software products of an already developed system.

Internal designs are at a lower level than external designs. External designs are at a lower level than detailed requirements provided by a user. In the present invention, a process to be executed between upper and lower levels concerns with a relation between products of these three levels. Coded programs residing at a lower level than internal designs are called "construction".

In developing a new system by reusing software products of an already developed system, software products of an already developed system, i.e., upper level specification such as data flow specifications and the like, are first checked to see which part of the software products can be reused.

However, in most cases, upper level specifications of an already developed system are not documented, or even if they are documented, they are poorly documented so that they do not correspond with the contents of lower level software products such as programs and lower level specifications. In such cases, it is very difficult to judge which part of lower level software products of the already developed system can be reused.

In order to solve this problem, there has been proposed, for example, "AUTOMATIC GENERATING SYSTEM FOR SOFTWARE SPECIFICATION" described in Japanese Patent Laid-open Publication JP-A-1-237726. According to this document, lower level software products such as programs and lower level specifications are used to generate in reversal upper level software products which correspond to the lower level software products.

The above-described conventional method is a method of automatically generating upper level software products from the contents of already existing software. This method is very effective for supporting the judgment which part of already existing software is reusable.

This method has been found, however, unsatisfactory in the following points.

(I) Although it is possible to estimate which part of already existing software is reusable and which part is required to be newly generated, it is impossible to particularly identify such parts which are reusable or newly generated. Specifically, with this method, it is impossible to particularly identify a part of lower level software products such as programs and lower level specifications which are reusable, a part which is required to be changed, and a part which is required to be newly generated, resulting in a difficulty in reducing a time required for changing lower level software products.

(II) Consider the case in which lower level software products are generated or changed upon changing upper level software products. In this case, with the above-described method, it is impossible to support generation and amendment of lower level software products such as programs and lower level specifications by semi-automatically generating and changing at least a part of the lower level software products.

(III) For changing lower level software products, it is impossible to support generation and amendment of the products by providing information representative of products to be newly generated, amended, or unnecessary for amendment.

(IV) Consider the case in which software products of multi-level ranging from upper to lower levels are collectively developed using already existing software products. In such a case, it is impossible to support reuse of already existing software products, by identifying reusable products and automatically generating and changing at least a part of lower level software products.

SUMMARY OF THE INVENTION

It is a first of the present invention to provide a method of supporting software reuse, capable of efficiently developing new software products, while particularly identifying which part of already existing lower level software products is reusable, to be changed, or required to be newly generated, when changing upper level software products.

It is a second object of the present invention to provide a method of supporting software reuse, capable of efficiently developing new software products, while semi-automatically generating or changing at least a part of the lower level software products, when the lower level software products are generated or changed upon changing upper level software products.

It is a third object of the present invention to provide a method of supporting software reuse, capable of efficiently and easily developing new software products, while providing information whether lower level software products are necessary to be newly generated, changed, or unnecessary to be changed, when changing the lower level software products upon changing upper level software products.

It is a fourth object of the present invention to provide a method of supporting software reuse, capable of efficiently developing new software products, while providing information of reusability, detecting a change field, automatically generated or changing at least a part of lower level software products, and providing information of the change field, when collectively developing software products of a multi-level ranging from lower to upper levels by using already existing software products.

In order to achieve the above objects of the present invention, according to one of the features of the present invention, there is provided a software reuse supporting method comprising: a step of generating in reversal at least one type of one upper level software product using at least one the of one lower level software product; a step of generating relational information between the lower level software product and the upper level software product when executing the reversal generation; a step of generating software product change field information representative of a software product change field when changing the upper level software product; and a step of generating at least one of the information of a software product reusable without change, the information of a software product required to be changed and a change field, and the information of a software product to be newly generated, respectively using the change field information and the relational information.

As an alternative, the method may further comprise a step of comparing at least one type of upper level software products before and after change, the comparing step being replaced with the step of generating software product change field information representative of software product change field when changing the upper level software product.

After executing the step of generating in reversal at least one type of one upper level software product using at least one type of one lower level software product and the step of generating relational information between the lower level software product and the upper level software product when executing the reversal generation, the relational information may be used in newly developing a software product.

In accordance with the relational information between the lower level software product and the upper level software product and the change field of the upper level software product, there may be generated at least one of the information of a software product reusable without change, the information of a software product required to be changed and a change field, and the information of a software product to be newly generated, respectively using the change field information and the relational information.

In accordance with the upper level software product change field and the software product relational information, there may be generated at least one of the information of a software product reusable without change, the information of a software product required to be changed and a change field, and the information of a software product to be newly generated. In accordance with the generated information, at least a part of the software product to be changed or newly generated may be automatically changed or newly generated.

There may be inputted at least one of the information of a software product reusable without change, the information of a software product required to be changed and a change field, and the information of a software product to be newly generated. In accordance with the inputted information, at least a part of the software product to be changed or newly generated may be automatically changed or newly generated.

In accordance with the upper level software product change field and the software product relational information, there may be generated at least one of the information of a software product reusable without change, the information of a software product required to be changed and a change field, and the information of a software product to be newly generated. When reusing, changing, or newly generating a lower level software product, the generated information is used for providing each software product with proper information representative of to be reusable, to be changed, or to be newly generated.

In accordance with the upper level software product change field and the software product relational information, there may be inputted at least one of the information of a software product reusable without change, the information of a software product required to be changed and a change field, and the information of a software product to be newly generated. In accordance with the inputted information, each software product may be provided proper information representative of to be reusable, to be changed, or to be newly generated.

According to another of the features of the present invention, there is provided a software reuse supporting method comprising: a step of executing the step of generating in reversal the upper level software product using the lower level software product and the step of generating relational information between the lower level software product and the upper level software product when executing the reversal generation, relative to a pair of multi-level software products including the lower level and upper level software products; a step of detecting the relational information between software products and the software product change field when each upper level software product is changed and each lower level software product is to be reused, changed, or newly generated; and a step of executing at least one of automatically changing/generating at least a part of each lower level software product to be changed or newly generated, and providing information of a presence/absence of a necessary change and of a necessary change field.

According to the present invention, in accordance with the relational information between upper and lower level software products obtained upon reversal generation of the upper level software product and the change field information obtained upon changing the upper level software product, the change field information of the lower level software product is automatically generated. The lower level software product change field information includes the information representative of a software product to be reused without change, the information representative of a software product to be changed and of its changed field, the information of a software product to be newly generated, and other information.

Therefore, it is possible to particularly identify which part of already existing lower level software products is reusable, to be changed, or required to be newly generated, when changing upper level software products, thereby efficiently developing a new software product while reusing already existing software products. Specifically, it is pointed out which part of lower level software products such as lower level specifications and programs is reusable, which part of and how lower level software products are to be changed, and what lower level software product is newly generated.

In reusing, changing, or newly generating a lower level software product, at least a part of the lower level software product can be automatically changed or newly generated in accordance with at least one of the changed field information of the lower level software product.

In reusing, changing, or newly generating a lower level software product, it is possible to provide the information representative of to be reusable, to be changed, or to be newly generated, in accordance with at least one of the change field information of the lower level software product.

For multi-level software products including the lower and upper level software products, an upper level software product is generated in reversal from lower level software products and the relational information between the lower level software product and the upper level software product is generated. When each upper level software product is changed and each lower level software product is to be reused, changed, or newly generated, the relational information between software products and the software product change field are detected. Then, there is executed at least one of automatically changing/generating at least a part of each lower level software product to be changed or newly generated, and providing information of a presence/absence of a necessary change and of a necessary change field.

BRIEF DESCRIPTION OF THE DRAWINGS

FIG. 3 is a functional block diagram of the software illustrated in FIG. 1;

FIGS. 5A to 5C show analyzed information of the system flow specifications shown in FIGS. 4A to 4C;

FIG. 6 shows an example of intermediate information used for generating an upper level data flow specification;

FIG. 11 shows an initial status when the change information shown in FIG. 10 is generated;

FIG. 15 shows analyzed information of the data flow specification shown in FIG. 9;

FIG. 16 is a flow chart showing the procedure to be executed by a third embodiment according to the present invention;

FIG. 19 is a flow chart showing the procedure to be executed by a fourth embodiment according to the present invention;

FIGS. 23A and 23B show examples of program specifications;

FIGS. 24A and 24B show examples of analyzed information of the program specifications;

FIGS. 29A and 29B show examples of program specifications reflecting the reuse information shown in FIG. 28.

DESCRIPTION OF THE PREFERRED EMBODIMENTS

Preferred embodiments of the present invention will be described in detail with reference to the accompanying drawings.

Figure 2:
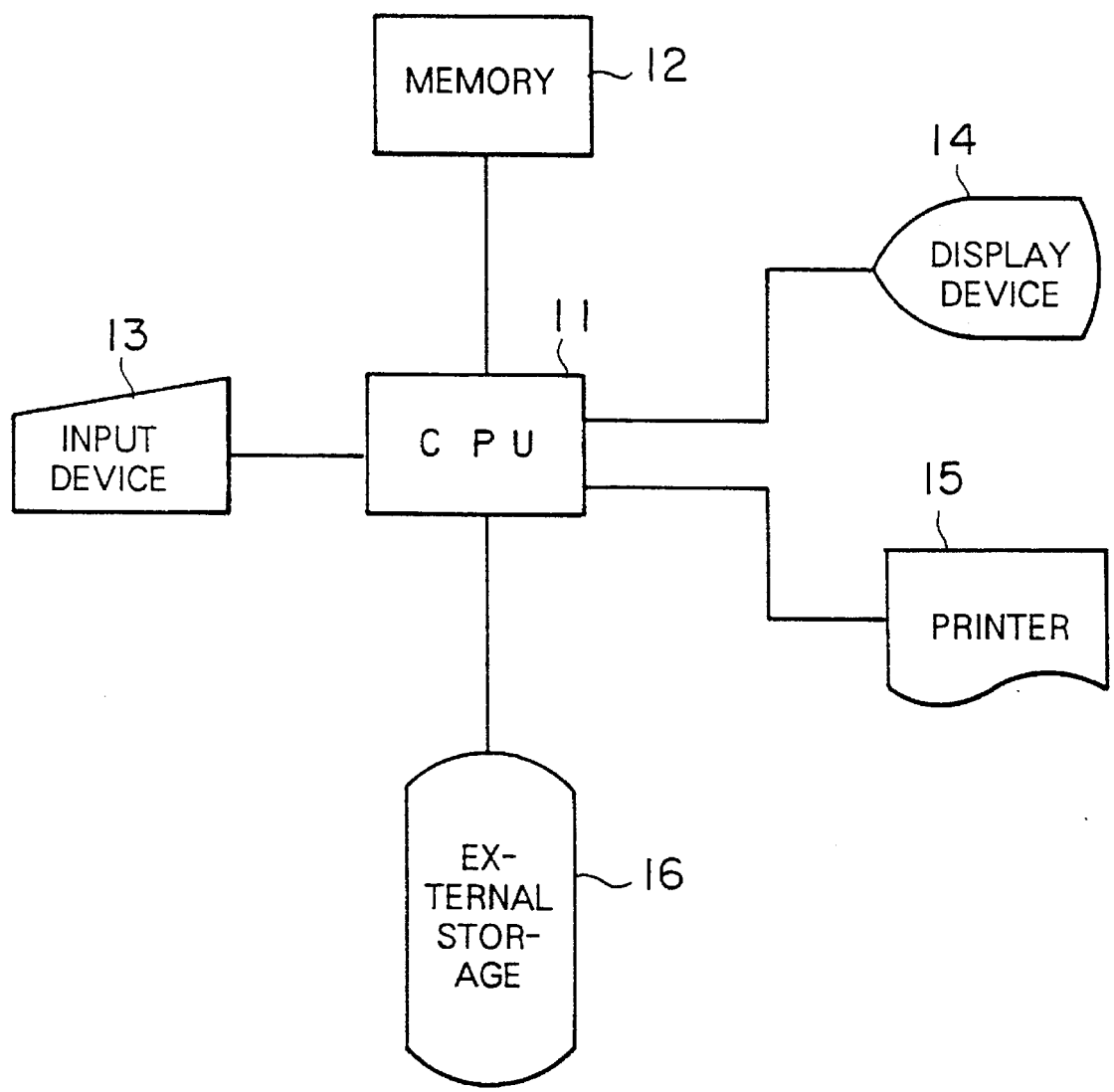
FIG. 2 is a schematic diagram showing hardware environments of a computer system embodying the present invention.

FIG. 2 is a block diagram showing a computer system embodying the present invention.

In FIG. 2, reference numeral 11 represents a CPU which executes a software reuse supporting program, reference numeral 12 represents a main storage for storing various data which is used when reusing software, reference numeral 13 represents an input device from which an operator enters an instruction or necessary data, reference numeral 14 represents a display device for displaying processed results or guidances, reference numeral 15 represents a printer for outputting hard copies of processed results or other data, and reference numeral 16 represents an external storage for storing data.

Figure 1:
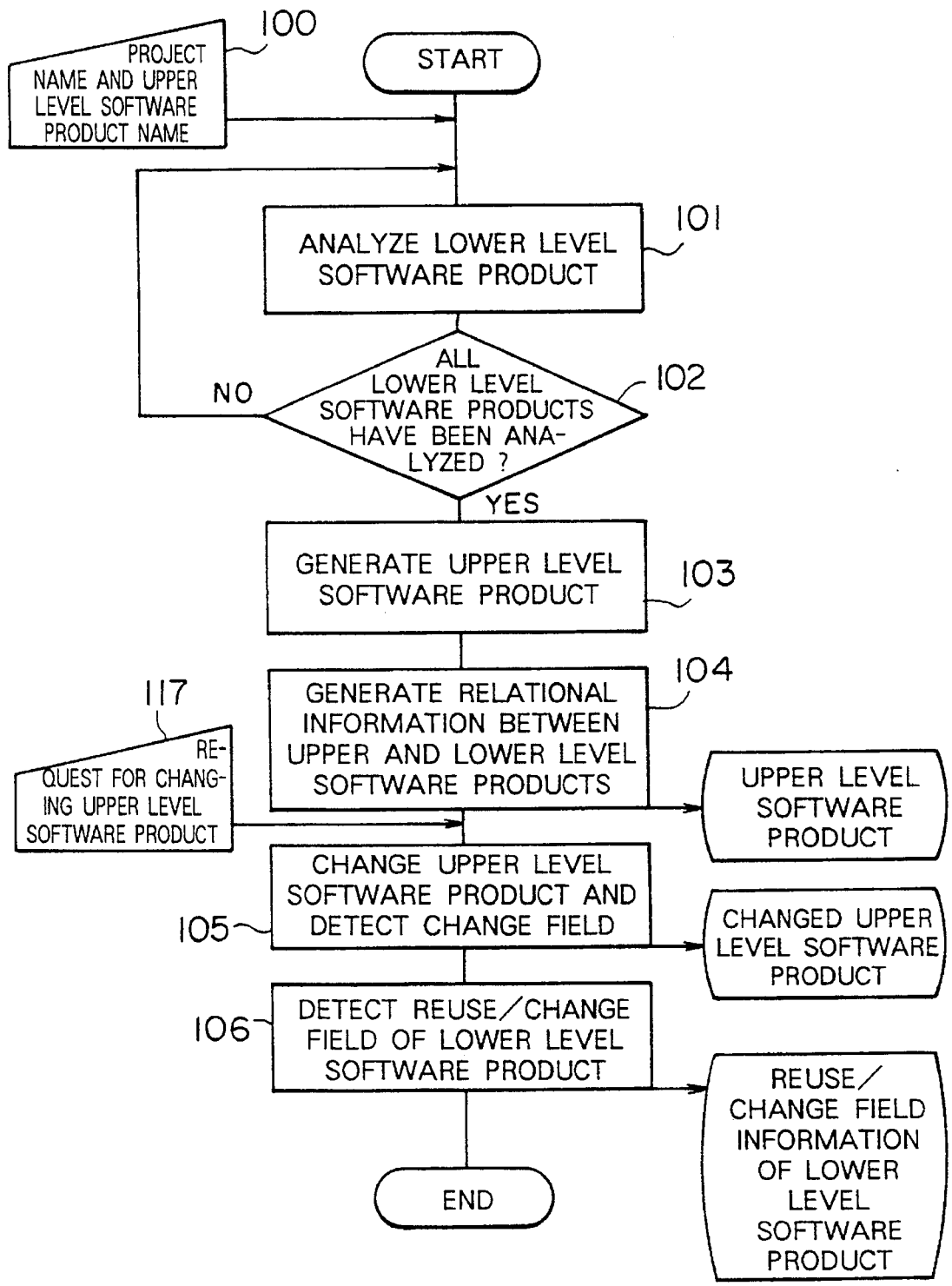
FIG. 1 is a flow chart showing the procedure to be executed by a first embodiment according to the present invention.

FIG. 1 is a flow chart of a software reuse supporting procedure according to a first embodiment of the present invention, and FIG. 3 is a functional block diagram of the computer system shown in FIG. 2.

As shown in rectangular blocks in FIG. 3, the main procedure of the present invention includes: a step 302 for generating in reversal an upper level software product 303 from lower level software products 301 read from the main storage; a step 305 for changing, upon request, the upper level software and detecting a change field; and a step 308 for detecting a change field of the lower level software products necessary for the reuse.

At the reverse generation step 302, at least one of, or one type of, lower level software products is analyzed to generate an upper level software product, and relational information 304 between lower level software products and the upper level software product is generated (to be described later with reference to FIG. 8).

Referring to FIG. 1, first, the lower level software products 301 shown in FIG. 1 are analyzed (step 101). The method of analyzing lower level software products changes with the type of data inputted by a user (to be described later with reference to FIGS. 5A to 5C). Next, it is judged whether all data inputted by a user 301 have been analyzed (step 102). If there is any data still not analyzed, the data analysis is repeated (step 101). If all the data has been analyzed, an upper level software product 303 is generated (step 103), and at the same time the relational information between the lower level software products 301 and the upper level software product 303 is generated (step 104). The step of forming an upper level software product (step 104) is executed before, or at the same time, the step of generating the relational information between software products (step 104) is executed.

At the step of changing an upper level software product and detecting a change field (step 305), the upper level software product 303 is changed and a change field is detected to generate change field information 307.

At the step of detecting a reuse change field of the lower level software products (step 308), a reuse change field of a lower level software product is detected (step 106) in accordance with the upper level software product change field information 307 and the relational information 304 between the software products, and reuse change information (309) of the lower level software products is generated.

Figure 4A:
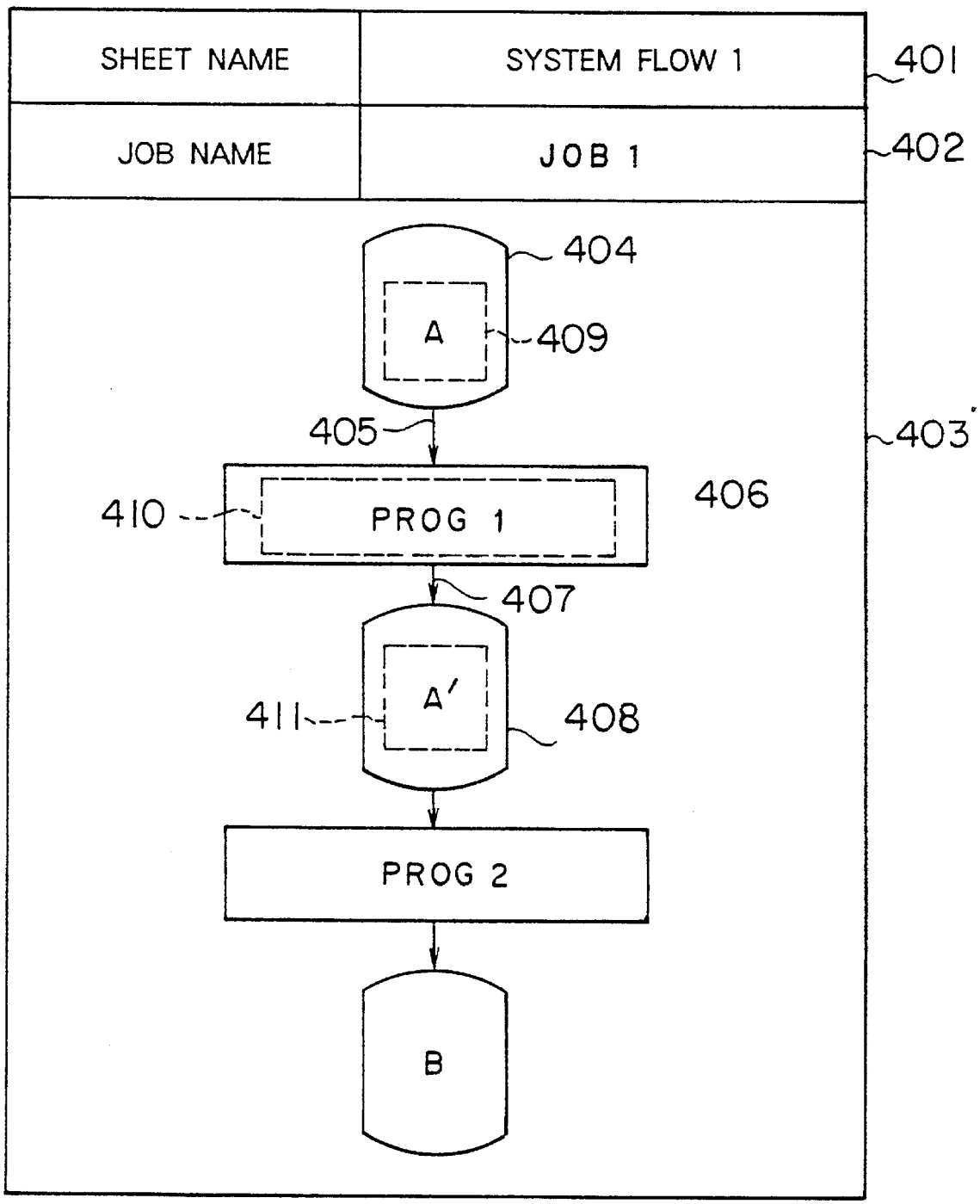
FIGS. 4A to 4C show examples of system flow specifications as lower level software products.
Figure 4B:
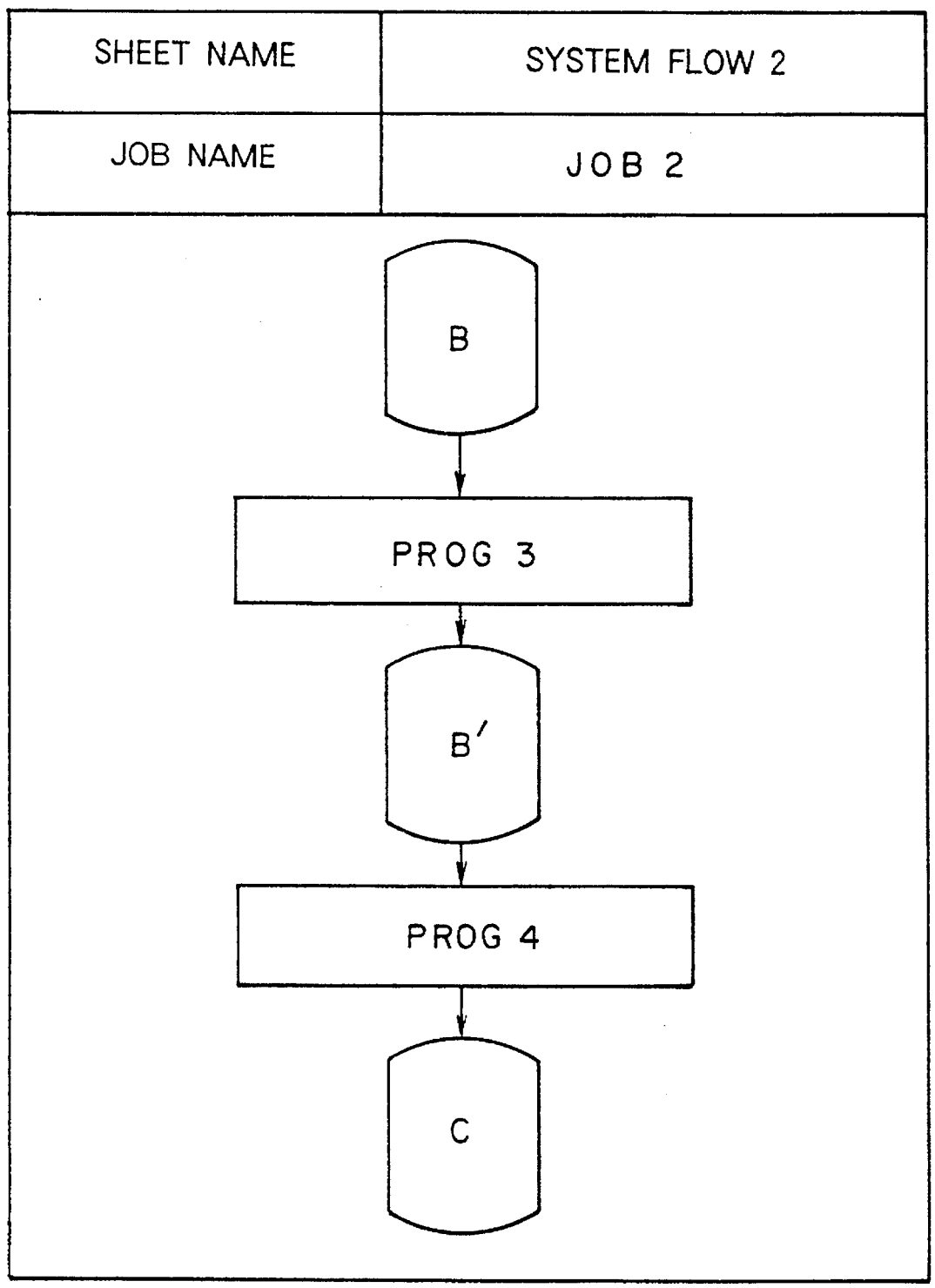
Figure 4C:
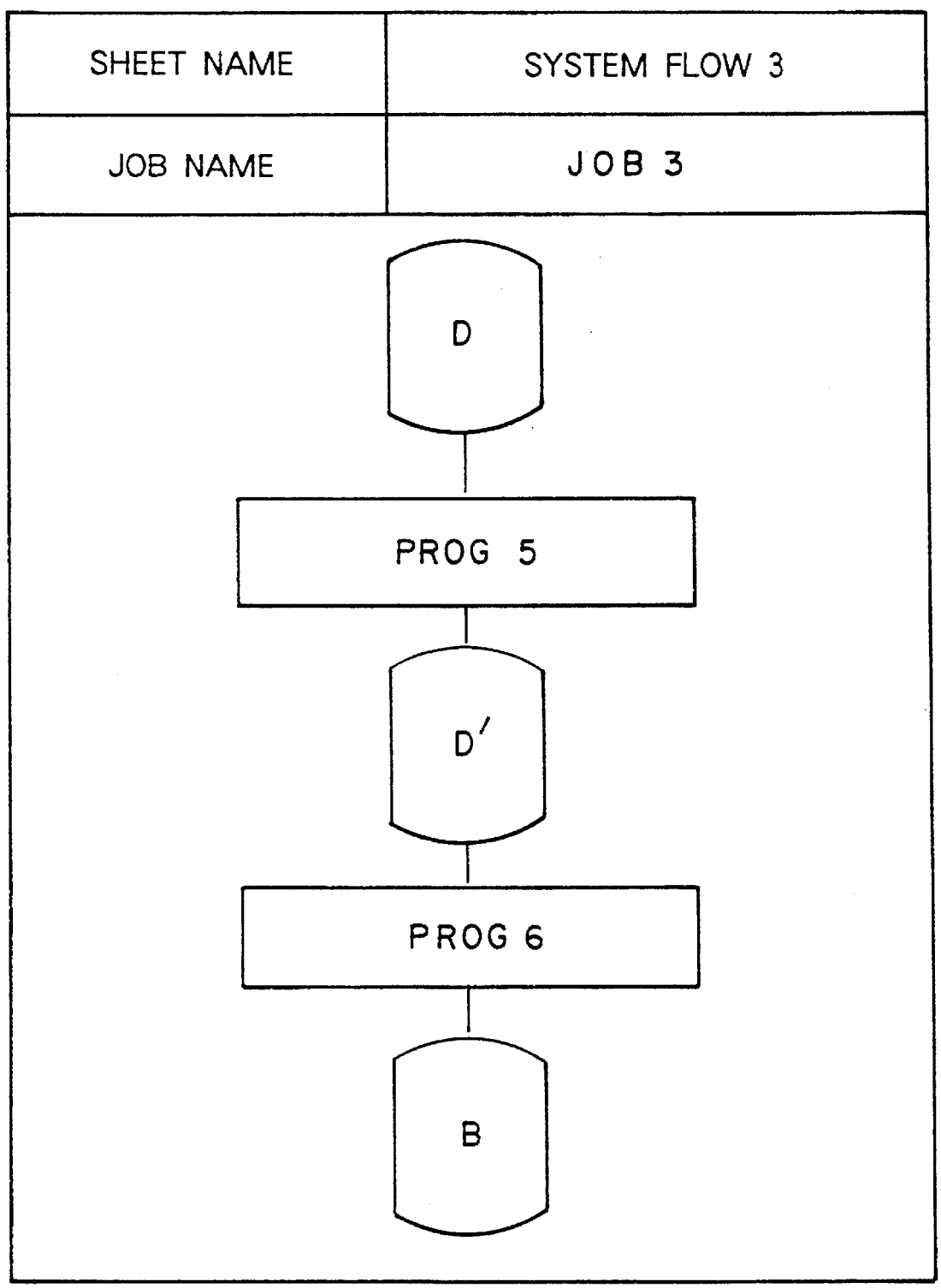

FIGS. 4A to 4C show examples of the lower level software products of FIG. 3 displayed on the display device 14.

The software products 301 indicate the execution order and input/output of programs for batch jobs (Each flow chart is called herein a system flow specification. It is also called a job flow). This system flow specification includes a sheet name field 401, a job name field 402, and a field 403 within which a control flow is displayed. Within the sheet name field 401, a particular sheet name of the system flow specification is displayed. Within the job name field 402, a particular job name for the system flow specification is displayed. The control flow field 403 includes boxes 404 and 498 representative of a file, a box 406 representative of a program, and two arrows interconnecting the two boxes.

The arrow 405 from the file box 404 to the program box 406 indicates that the file 404 serves as an input to the program 406. The arrow from the program box 406 to the file box 408 indicates that the file 408 serves as an output from the program 406.

A file name is described within a file box, and a program name is described within a program box.

In FIG. 4A, "SYSTEM FLOW 1" is a sheet name, "JOB 1" is a job name, "A", "A'", and "B" are a file name, and "Prog 1" and "Prog 2" are a program name.

FIGS. 5A to 5C show examples of the information of system flow specifications of FIGS. 4A to 4C analyzed at the lower level software analyzing step.

As shown in FIG. 5, the information of the lower level software products analyzed at the step 101 of FIG. 1 includes, for example, a sheet name field 501, a job name field 502, a program name field 503, an input file name field 504, and an output file name field 505.

In the sheet name field 501, the sheet name of the system flow specification is stored. In the job name field 502, a particular job name for the system flow specification is stored. In the program name field 503, a particular program name for the system flow specification is stored. In the input file name field 504, a file name is stored, the file serving as an input to the program identified by the program name stored in the program name field 503 on the same row. In the output file name field 505, a file name is stored, the file serving as an output from the program identified by the program name stored in the program name field 503. The analyzed information of the specification of FIG. 4A is shown in FIG. 5A, the analyzed information of the specification of FIG. 4B is shown in FIG. 5B, and the analyzed information of the specification of FIG. 4C is shown in FIG. 5C.

At the lower level software product analyzing step 101 of FIG. 1, system flow analyzed information of FIGS. 5A to 5C is generated in accordance with the system flow specifications of the lower level software products shown in FIGS. 4A to 4C. In this analyzing procedure, the system flow analyzed information is generated while paying attention to the input/output information of the programs in the system flow specifications. For example, upon analyzing the specification of FIG. 4A, it is understood that for the program name "Prog 1" the file name "A" 404 is an input file and the file name "A'" is an output file. Accordingly, the file name 409 in FIG. 4A is entered as the input file name 510 of FIG. 5A, the program name 410 of FIG. 4A is entered as the program name 512 of FIG. 5A, and the file name 411 of FIG. 4A is entered as the file name 506 of FIG. 5A.

FIG. 6 shows intermediate information generated from the system flow analyzed information of FIGS. 5A to 5C for generation of an upper level software product.

In FIG. 6, input/output files are extracted for each system flow specification.

The intermediate information includes a sheet name field 601, a project name field 602, a job name field 603, an input file name field 604, and an output file name field 605. In the sheet name field 601, a particular sheet name of an upper level specification is stored. In the project name field 602, a particular project name of the upper level specification is stored. In the job name field 603, a particular job name of the upper level specification is stored. In input file name field 604, a file name is stored, the file serving as an input to the job whose name is being stored in the job name field 603 on the same row. In the output file name field 605, a file name is stored, the file serving as an output from the job whose name is being stored in the job name field 603 on the same row.

Figure 7:
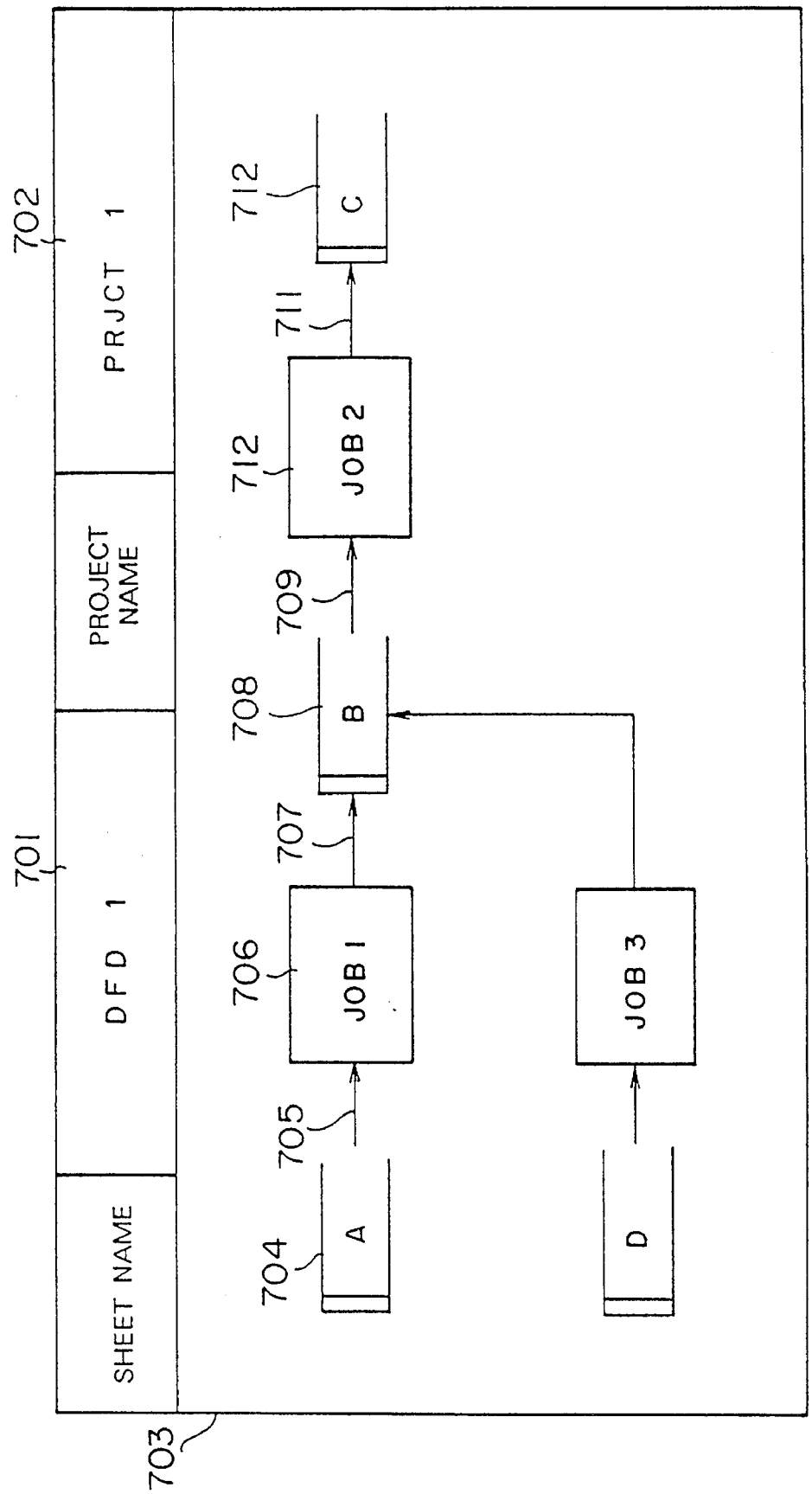
FIG. 7 shows an example of an upper level data flow specification as an upper level software product.

FIG. 7 shows an example of an upper level software product generated from the intermediate information of FIG. 6.

This upper level software product is a specification indicating the data flow between jobs of a given project, this specification being called herein a data flow specification.

The data flow specification includes a sheet name field 701, a project name field 702, and a field 703 displaying a data flow. Within the sheet name field 701, a particular sheet name of the data flow specification is displayed. With the project name field 702, a particular project name of the data flow specification is displayed. The data flow display field 703 includes boxes 704 and 708 representative of a file, a box 706 representative of a job, and arrows 705 and 707 coupling the two boxes. The arrow 705 from the file box 704 to the job box 706 indicates that the file 704 serves as an input to the job 706. The arrow 707 from the job box 706 to the file box 708 indicates that the file 708 serves as an output from the job 706. A file name is described within a file box, and a job name is described within a job box.

In FIG. 7, "DFD 1" is a sheet name, "PRJCT 1" is a project name, "A", "B", "C", and "D" are a file name, and "JOB 1", "JOB 2", and "JOB 3" are a job name.

At the upper level software product generating step 103 of FIG. 1, the intermediate information of FIG. 6 is first generated from the system flow analyzed information of FIGS. 5A to 5C, and then the data flow specification of FIG. 7 is generated. The intermediate information of FIG. 6 is generated from the system flow analyzed information of FIGS. 5A to 5C at the step 103 in the following manner. Specifically, in the sheet name field 601 and project name field 602, there are stored user inputted names. In the job name fields 603, there are stored names in the job name fields 502 of the system flow specifications.

An intermediate file name is defined herein as a file name which is described both in the input and output file name fields of a system flow specification and not referred to by any other system flow specification.

A file name with an intermediate file name being removed from those described in the input file name fields 504 is entered into the input file name field 604. Similarly, a file name with an intermediate file name being removed from those described in the output file name fields 505 is entered into the output file name field 605. For example, the job name "JOB 1" (at field 508) is entered in the job name field 606, the file name "A'" (at fields 506 and 507) is an intermediate file name, the file name "A" (at field 509) is entered in the file name field 607, and the file name "B" (at field 510) is entered in the file name field 608.

Furthermore, at the step 103 of FIG. 1, in generating the upper level software product of FIG. 7 from the intermediate information of FIG. 6, display symbol/field information is added to respective elements such as files, programs, and arrows shown in FIG. 7.

Figure 8:
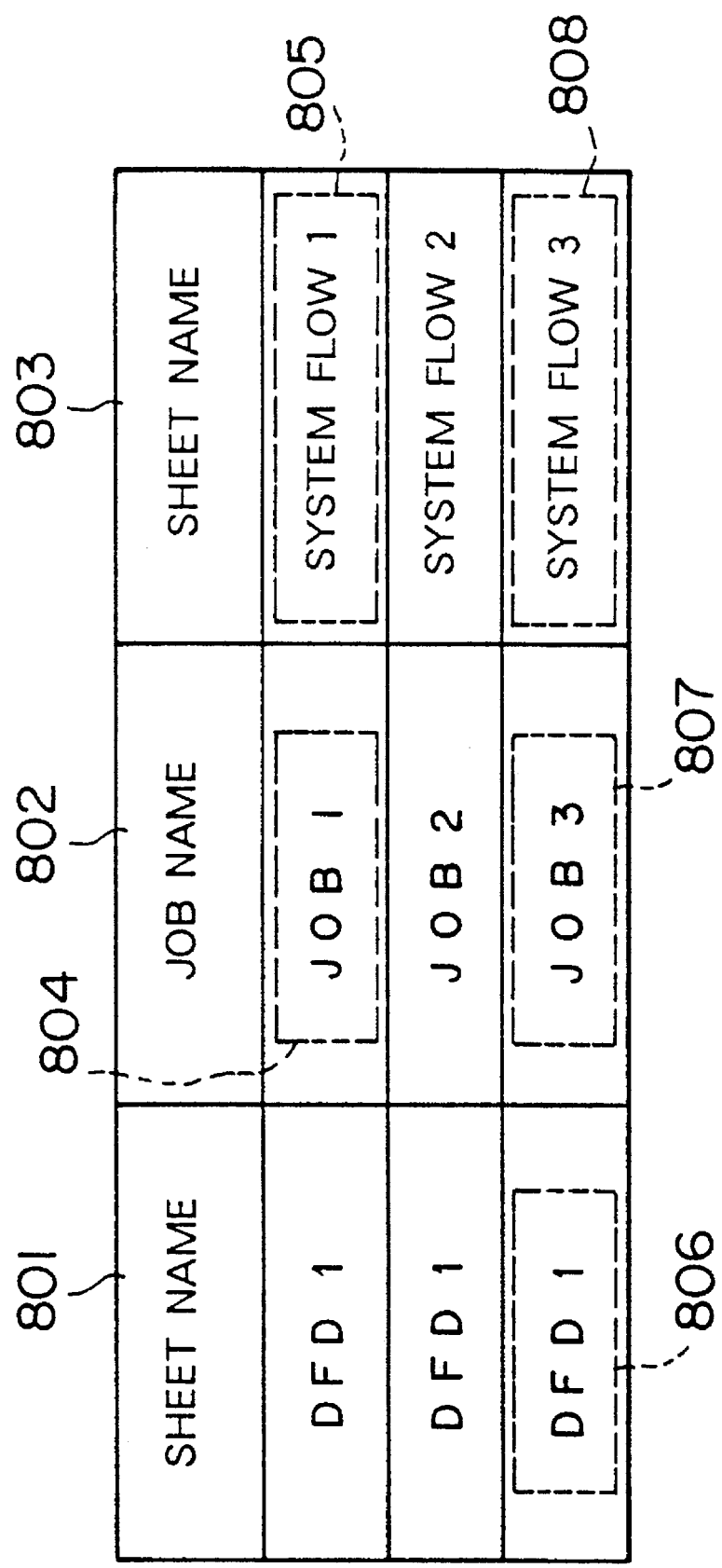
FIG. 8 shows an example of relational information between the system flow specification and the data flow specification.

FIG. 8 shows an example of relational information between lower level software products and an upper level software product. In this example, there is shown relational information between system flow specifications (lower level software products) and a data flow specification (upper level software product). This relational information includes two sets of sheet name fields 801 and 803 and a set of job name fields 802. In the sheet name field 801, a particular name of a data flow specification (upper level software product) is stored. In the job name field 802, a particular job name within the data flow specification is stored. In the sheet name field 803, a particular sheet name of a system flow specification is stored, the system flow specification being identified by the job name stored in the job name field 802 of the data flow specification identified by the sheet name field 801 on the same row.

At the step 105 of changing an upper level software product and detecting the change field shown in FIG. 1, a user inputted name assigned to an upper level software product to be changed, is stored in the sheet name field 801. In the job name field 802, there is stored a name in the job name field 502 of the analyzed information of the system flow specification. In the sheet name field 803, there is stored a name in the sheet name field 501 of the analyzed information of a system flow specification.

For example, the job name "JOB 1" (at field 508) is entered in the job name field 804, and the sheet name "SYSTEM FLOW 1" (at field 509) is entered in the sheet flow name field 805.

Figure 9:
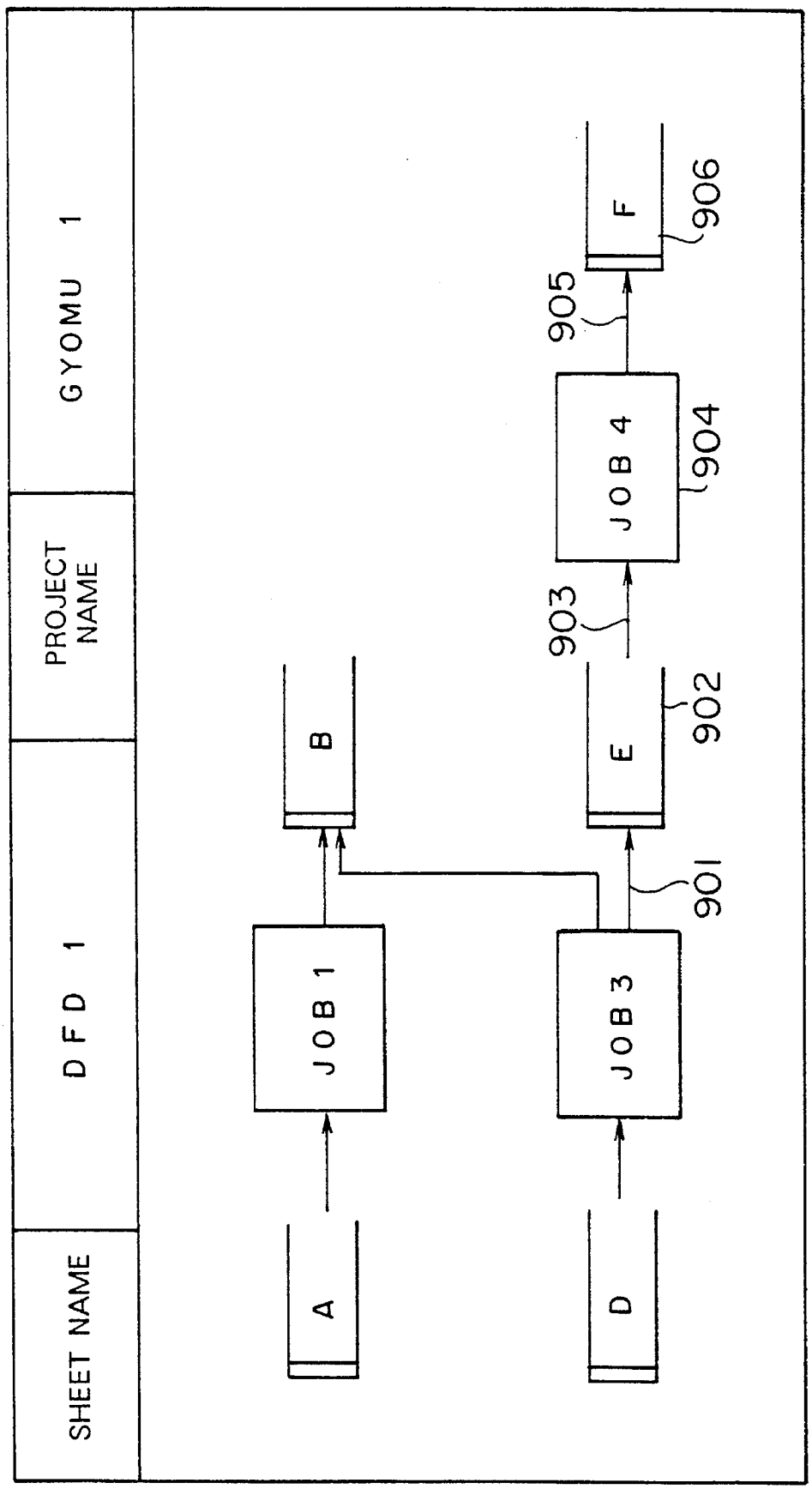
FIG. 9 shows a data flow specification obtained upon changing the data flow specification shown in FIG. 7.

FIG. 9 shows an example of an upper level software product changed upon execution of the step of changing an upper level software product and detecting a change field shown in FIG. 3.

In this example, the data flow specification is shown as obtained by changing the data flow specification shown in FIG. 7.

At the step 105 of changing an upper level software product and detecting a change field shown in FIG. 1, a user instructs, by using a user editor comprised by the input device 13 and display device 14, to delete the job box 710, file box 712, and file input/output arrows 709 and 711 from the data flow specification shown in FIG. 7, and add a job box 904, file boxes 902 and 906, and file input/output arrows 901, 903, and 905.

Figure 10:
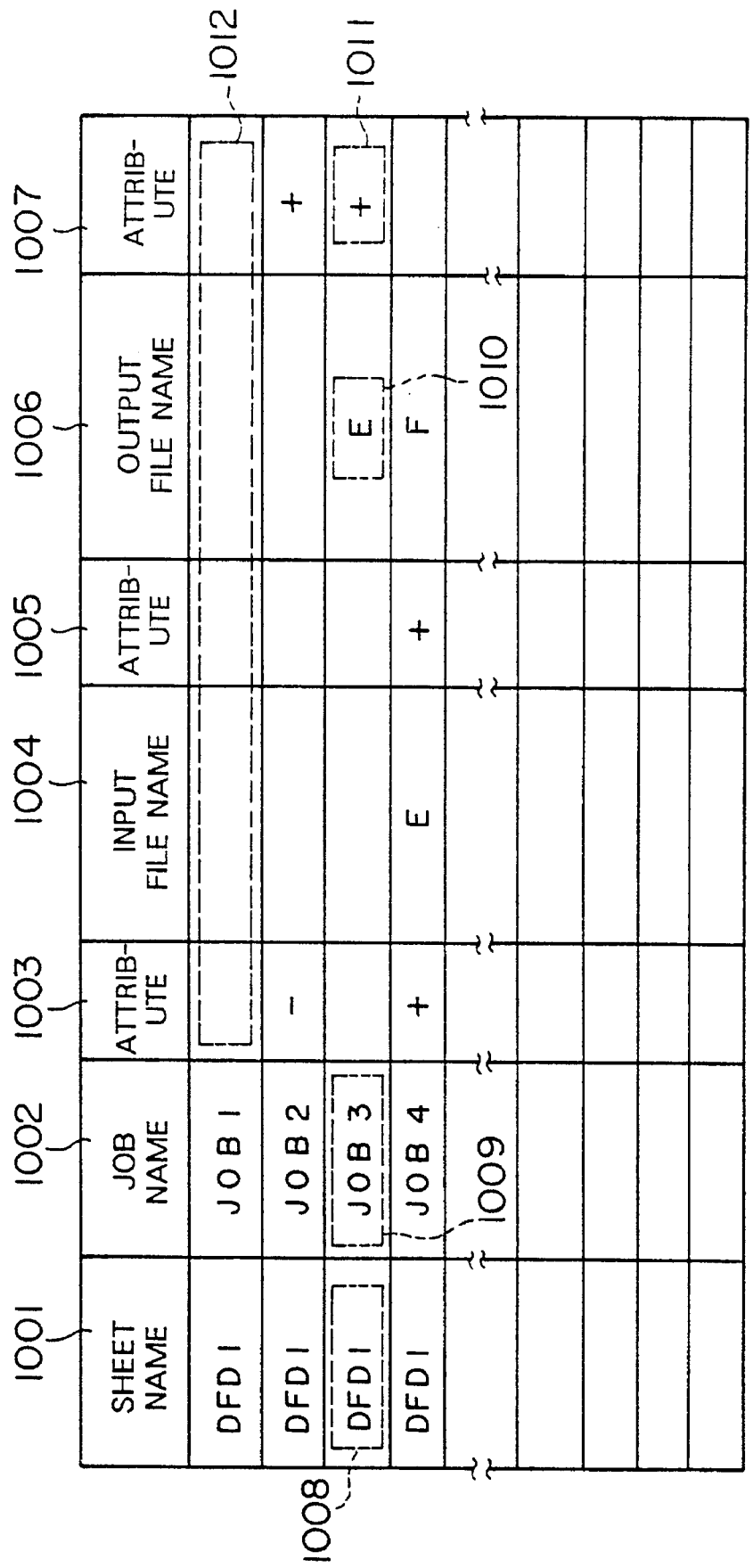
FIG. 10 shows an example of change information of the data flow specification.

FIG. 10 shows an example of change field information of the upper level software product generated upon execution of the step of changing an upper level software and detecting a change field shown in FIG. 3.

The change field information 307 shown in FIG. 3 includes a sheet name field 1001, a job name field 1002, a job attribute field 1003, an input file name field 1004, an input file attribute field 1005, an output file name field 1006, and an output file attribute field 1007.

In the sheet name field 1001, there is stored a particular sheet name of a data flow specification of an upper level software product. In the job name field 1002, there is stored the job name described in the data flow specification. In the job attribute field 1003, there is stored a flag indicating addition/deletion of the job identified by the job name on the same row. In the input file field 1004, there is stored an input file name of the job identified by the job name on the same row. In the input file attribute field 1005, there is stored a flag indicating addition/deletion of the job identified by the input file name on the same row. In the output file name field 1006, there is stored an output file name of the job identified by the job name on the same row. In the output file attribute field 1007, there is stored a flag indicating addition/deletion of the file identified by the output file name on the same row. In each of the attribute fields 1003, 1005, and 1007, "+" represents addition, "−" represents deletion, and " " (blank) represents no change.

FIG. 11 shows initial settings for the data flow change information shown in FIG. 10.

In FIG. 11, job names extracted from the job name fields 603 of the data flow analyzed information shown in FIG. 6 are stored in the job name fields 1002 for the change field information, the fields of which are initially blank.

At the step 105 of changing an upper level software product and detecting a change field shown in FIG. 1, there are executed the software product changing operation as well as the change field detecting operation.

At the same time when a job, an input file, or an output file is added/deleted during the data flow changing operation, the data flow change information shown in FIG. 11 is updated. Therefore, the data flow change information can be obtained which is correctly in correspondence with the data flow specification at that time. For example, if a user instructs by using the input device 13 and display device 14 to add an output file for the job name "JOB 3", the output file name is stored in the output file name field 1006 on the same row as of the job name field 1002 for the "JOB 3", and the addition symbol "+" is stored in the attribute field 1007 on the same row (indicated at 1011 of FIG. 10).

Figure 12:
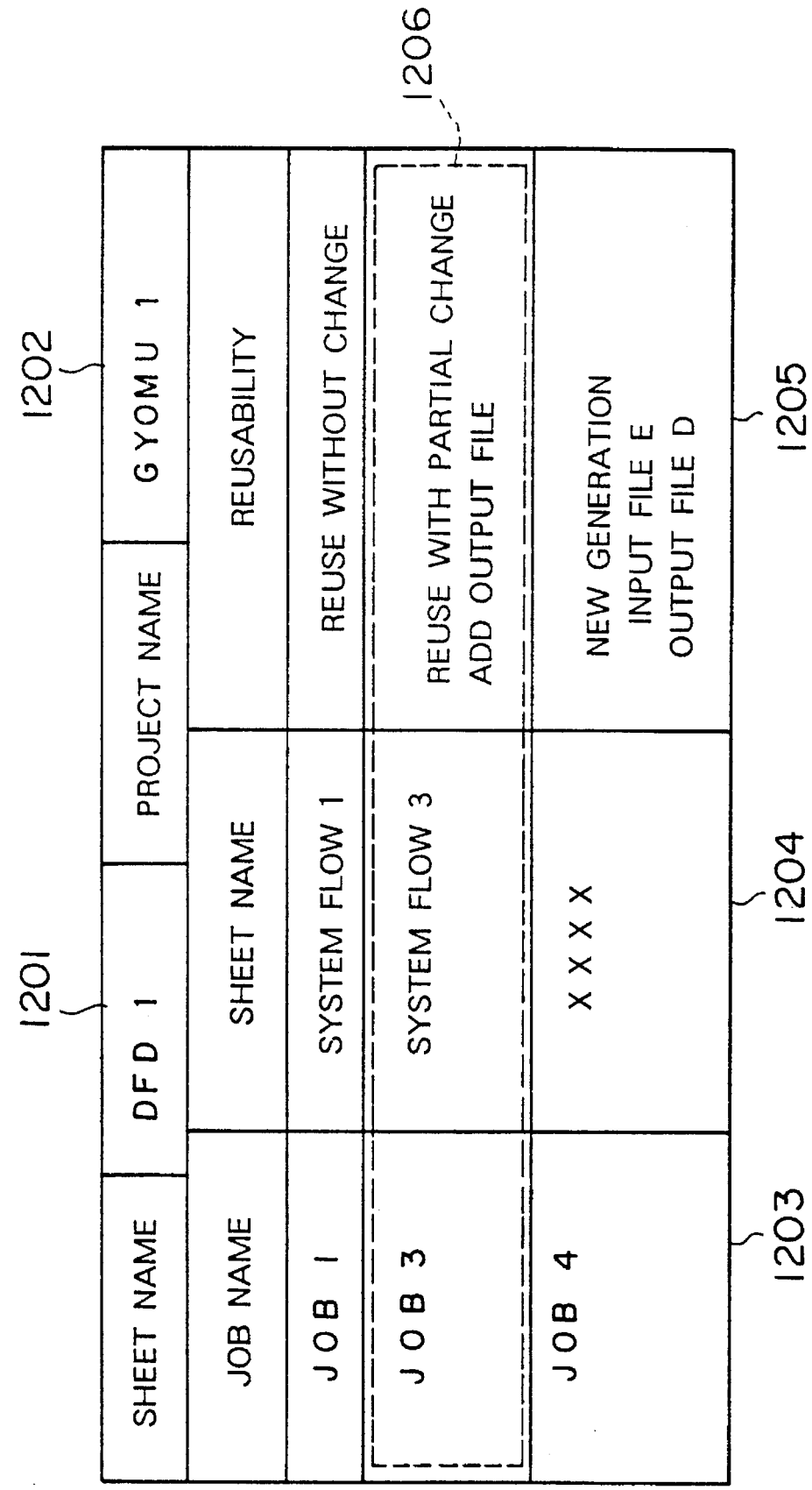
FIG. 12 shows an example of reuse information of the system flow specification.

FIG. 12 shows the lower level software product reuse/change field information shown in FIG. 3.

As shown in FIG. 3, using the upper level software product change field information 307 and upper level software product relational information 304, the lower level software product reuse/change field detecting step 308 generates the reusability list 309 of the lower level software products shown in FIG. 12. This list indicates a reusability of the system flow specification (lower level software product), in accordance with the change field information of the data flow specification (upper level software product) shown in FIG. 10 and the relational information (software product relational information) shown in FIG. 8 between the data flow specifications and system flow specifications.

The reuse/change field information 9 includes a sheet name field 1201, a project name field 1202, a job name field 1203, a system flow specification name field 1204, and a reusability field 1205. In the sheet name field 1201, there is displayed a particular sheet name of a data flow specification which was generated in reversal from system flow specifications to be reused. In the object name field 1202, there is displayed a particular project name of the data flow specification. In the job name field 1203, there is displayed a particular job name contained in the changed data flow specification (refer to FIG. 9). In the system flow specification name field 1204, there is displayed a particular name of the system flow specification having detailed jobs identified by the job name on the same row. In the reusability field 1205, there is displayed information whether the system flow specification on the same row can be reused, should be changed, or a new system flow specification is to be generated. This reuse/change field information indicates that the specification for the sheet name "SYSTEM FLOW 1" can be reused without amendment, and that the specification for the sheet name "SYSTEM FLOW 3" can be reused if "E" is inserted at a proper position as an output file. The system specification for the job name "JOB 4" does not exist so that it is required to be newly generated. In this case, "E" is displayed as an input file, and "F" is displayed as an output file "F".

At the step 106 of detecting a reuse/change field of the lower level software products shown in FIG. 1, in order to generate the reuse/change field information shown in FIG. 12, job change information of the data flow specification is extracted from the software product change information shown in FIG. 10, and system flow specification information for the jobs in concern is extracted from the software product relational information shown in FIG. 8. For example, in the case of the job name "JOB 3" at field 1009 for the sheet name "DFD 1" at field 1008 shown in FIG. 10, it can be recognized that "E" at field 1010 is added ("+" at field 1011), and that from FIG. 8 the sheet name for the job name "JOB 3" at field 807 of the sheet name "DFD 1" at field 806 is "SYSTEM FLOW 3" at field 808.

As described above, according to the present embodiment, it is possible to particularly identify which part of already existing lower level software products is reusable or newly generated, upon changing an upper level software product. Specifically, it is possible to particularly point out which part of, and how, already existing lower level software products, such as lower level specifications and programs, are to be changed or newly generated. It is therefore possible to efficiently develop a new software product by reusing already existing software products.

Figure 13:
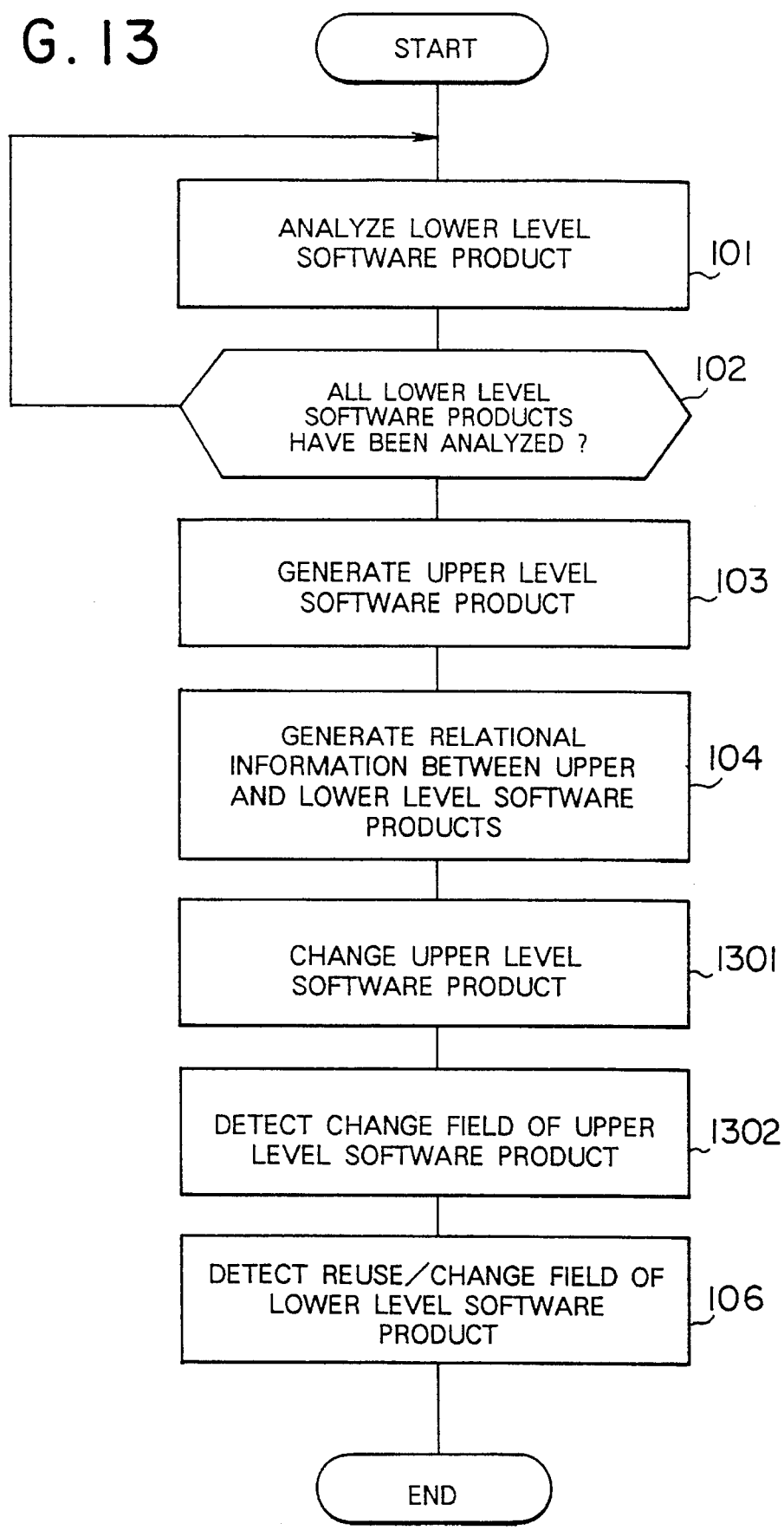
FIG. 13 is a flow chart showing the procedure to be executed by a second embodiment according to the present invention.
Figure 14:
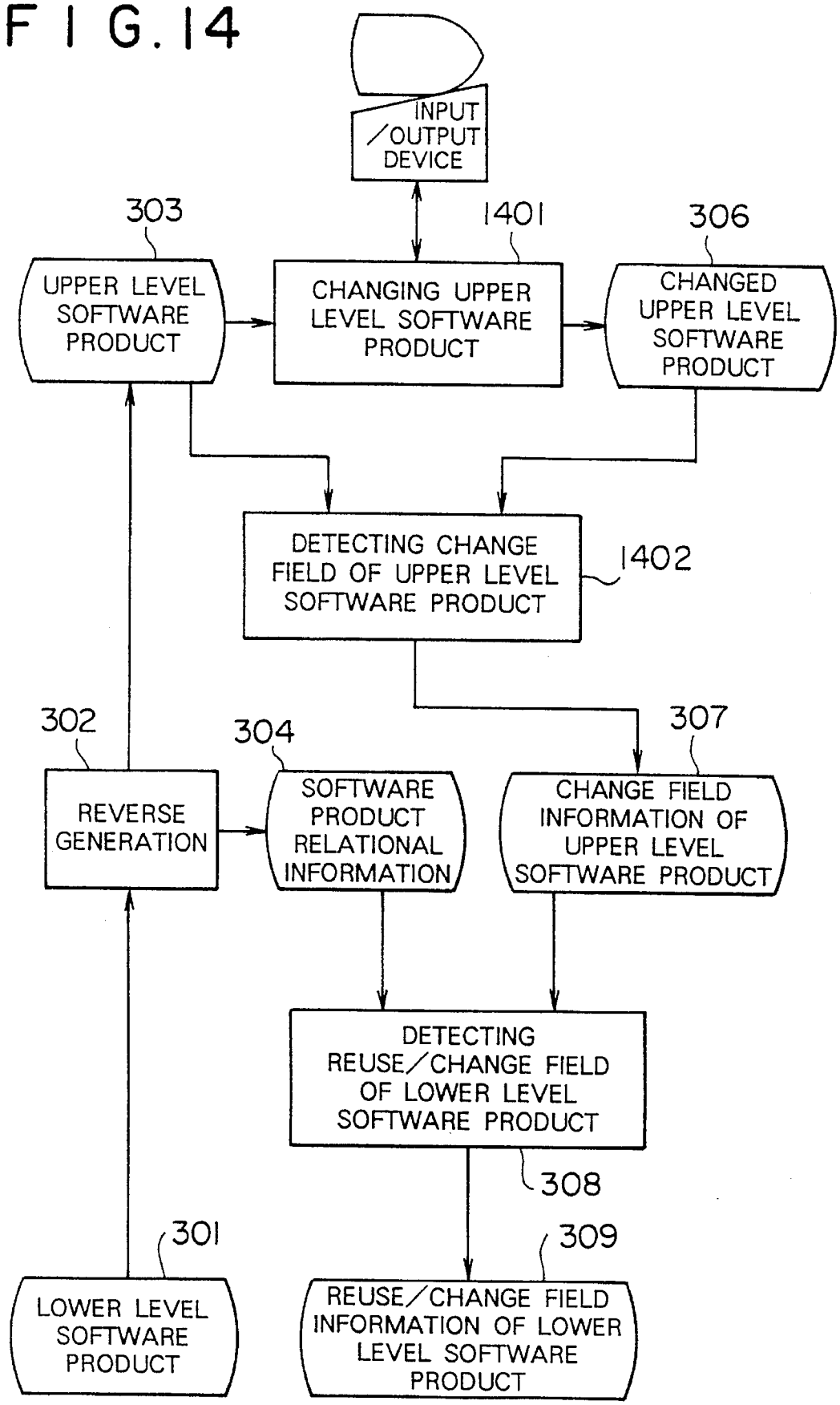
FIG. 14 is a functional block diagram of the software illustrated in FIG. 13.

FIG. 13 is a flow chart showing the procedure of a software reuse supporting method according to another embodiment of the present invention, and FIG. 14 is functional block diagram realizing the function to be executed by the flow chart shown in FIG. 13.

In the first embodiment shown in FIG. 1, it is necessary to provide a dedicated support function of detecting a change field while a user changes an upper level software product, as shown at the step 305 of FIG. 3. In contrast, in this embodiment, there are separately provided a step of changing an upper level software product and a step of detecting a change field. Therefore, the changing operation can be performed using a conventional function of supporting a changing operation, so that a response to detecting a change field can be improved by detecting it during the changing operation.

It this embodiment, as shown in FIG. 13, the step 105 of FIG. 1 is divided into a step 1301 and a step 1302. The other steps are the same as FIG. 1.

The step 1301 shown in FIG. 13 generates a new upper level software product 306 from an upper level software product 303 as shown in FIG. 14 (at step 1401).

The step 1301 shown in FIG. 13 is dedicated only to the function, among the functions shown at the step 105 in FIG. 1, of generating, for example, the specification information shown in FIG. 9 from the specification information shown in FIG. 7 by using the input device 13 and display device 14.

The step 1302 shown in FIG. 13 generates upper level software product change field information 307 shown in FIG. 14 (at step 1402), by comparing the upper level software product 303 with the changed upper level software product 306.

FIG. 15 shows an example of intermediate information obtained from the changed upper level software product.

FIG. 15 differs from FIGS. 6 and 10 in that FIG. 6 shows an example of the intermediate information for an upper level software product and that FIG. 10 shows an example of the change information of an upper level software product.

The format of FIG. 15 is the same as FIG. 6. The intermediate information extracted as shown in FIGS. 6 and 15 is used for comparison between the two upper level software products respectively before and after the change.

In the example shown in FIGS. 6 and 15, detecting a change field between the two upper level software products is performed as follows. The job name "JOB 1" stored in the job name field 603 in FIG. 6 is present as "JOB 1" in the job name field 1503 in FIG. 15. Therefore, in this case, the input file name "A" and output file name "B" respectively stored in the input file field 604 and output file field 605 on the same line as the job name "JOB 1" in FIG. 6, are compared with the input file name "A" and output file name "B" on the same line as the job name "JOB 1" in FIG. 15. Since the input and output file names are the same for both the intermediate information, as shown in FIG. 10 a blank (at field 102) is entered as the change field information for the job name "JOB 1".

The job name "JOB 2" in FIG. 6 is not present in any job name field in FIG. 15. Therefore, a minus symbol "−" indicating deletion is entered in the job attribute field 1003 for the job name "JOB 2" shown in FIG. 10.

The job name "JOB 3" in FIG. 6 is present in the job name field in FIG. 15. Therefore, the input and output file names "D" and "B" for the job name "JOB 3" in FIG. 6 are compared with the input file name "D" and output file names "B, E" on the same row as the job name "JOB 3" in FIG. 15. Since the output file name "E" is additionally entered, "E" is entered in the output file name field 1006 for the job name "JOB 3" in FIG. 10 and a plus symbol "+" indicating addition is entered in the output file name change attribute field 1007.

A job name "JOB 4" is not present in any job name field 603 in FIG. 6, but is present in the job name field 1503 in FIG. 15. Therefore, the job name "JOB 4" is entered in the job name field 1002 in FIG. 10, and a plus symbol "+" indicating job addition in the job name change attribute field 1003. The input file name "E" and output file name "F" on the same row as the job name "JOB 4" in FIG. 15 are entered into the input file name field 1004 and output file name field 1006 on the same row for the job name "JOB 4" in FIG. 10 and a plus symbol "+" indicating addition is entered into the file attribute fields 1005 and 1007.

According to the present embodiment, there are separately provided a step of changing an upper level software product and a step of detecting the change field. Therefore, a response to detecting a change field can be improved by detecting it during the changing operation. Furthermore, the changing operation can be performed using a conventional function of supporting a changing operation.

Figure 17:
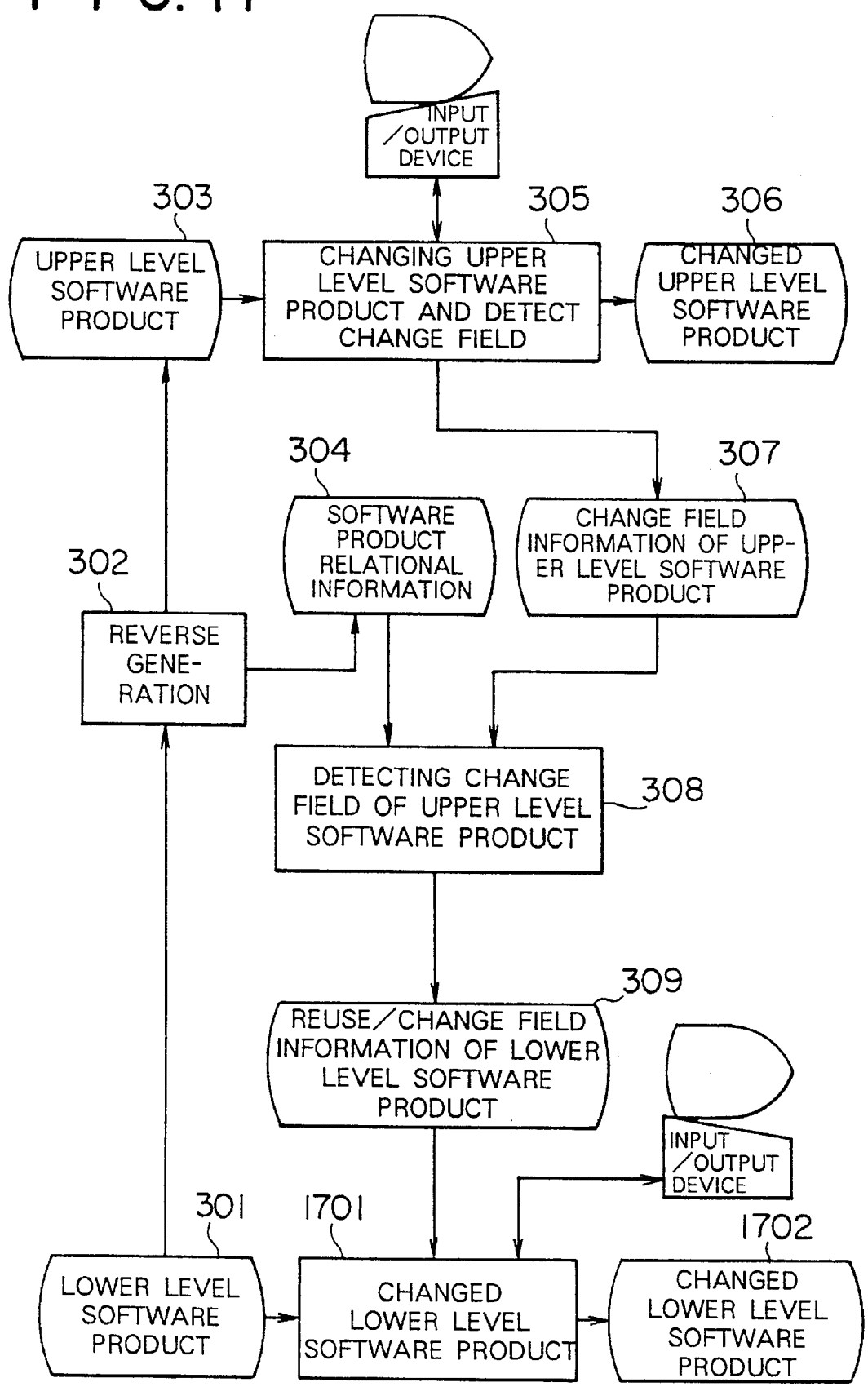
FIG. 17 is a functional block diagram of the software illustrated in FIG. 16.

FIG. 16 is a flow chart showing the procedure of a software reuse supporting method according to a third embodiment of the present invention, and FIG. 17 is a functional block diagram realizing the function to be executed by the method shown in FIG. 16.

In the first embodiment shown in FIG. 1, a reusability of a lower level software product is provided after an upper level software product is changed. In contrast, in this embodiment, using the change field information of a lower level software product, there is generated a new lower level software product corresponding to the changed upper level software product.

In the flow chart shown in FIG. 16, a step 1601 is added to the flow chart shown in FIG. 1, the other steps being the same as FIG. 1.

At the step 1601 shown in FIG. 16, each of the lower level software products analyzed at the step 101 is changed in accordance with the lower level software product reuse/change field information generated at the step 106.

The functional block diagram shown in FIG. 17 has a lower level software product changing function 1701 and a changed, lower level software product 1702. Each lower level software product 301 is changed using the lower level software reuse/change field information 309 to obtain the changed lower level software product 1702.

Figure 18A:
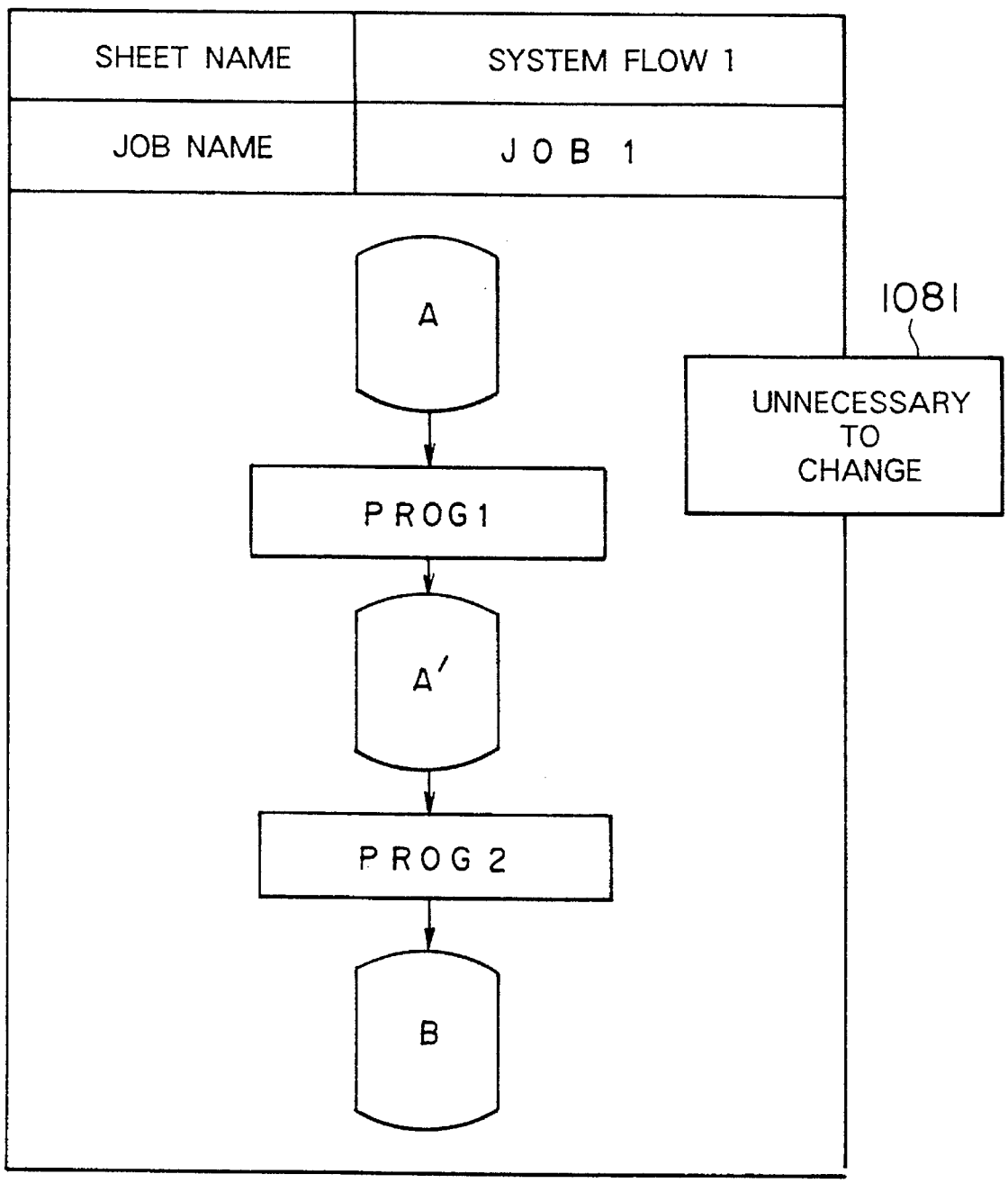
FIGS. 18A to 18C show examples of system flow specifications reflecting the reuse information shown in FIG. 12.
Figure 18B:
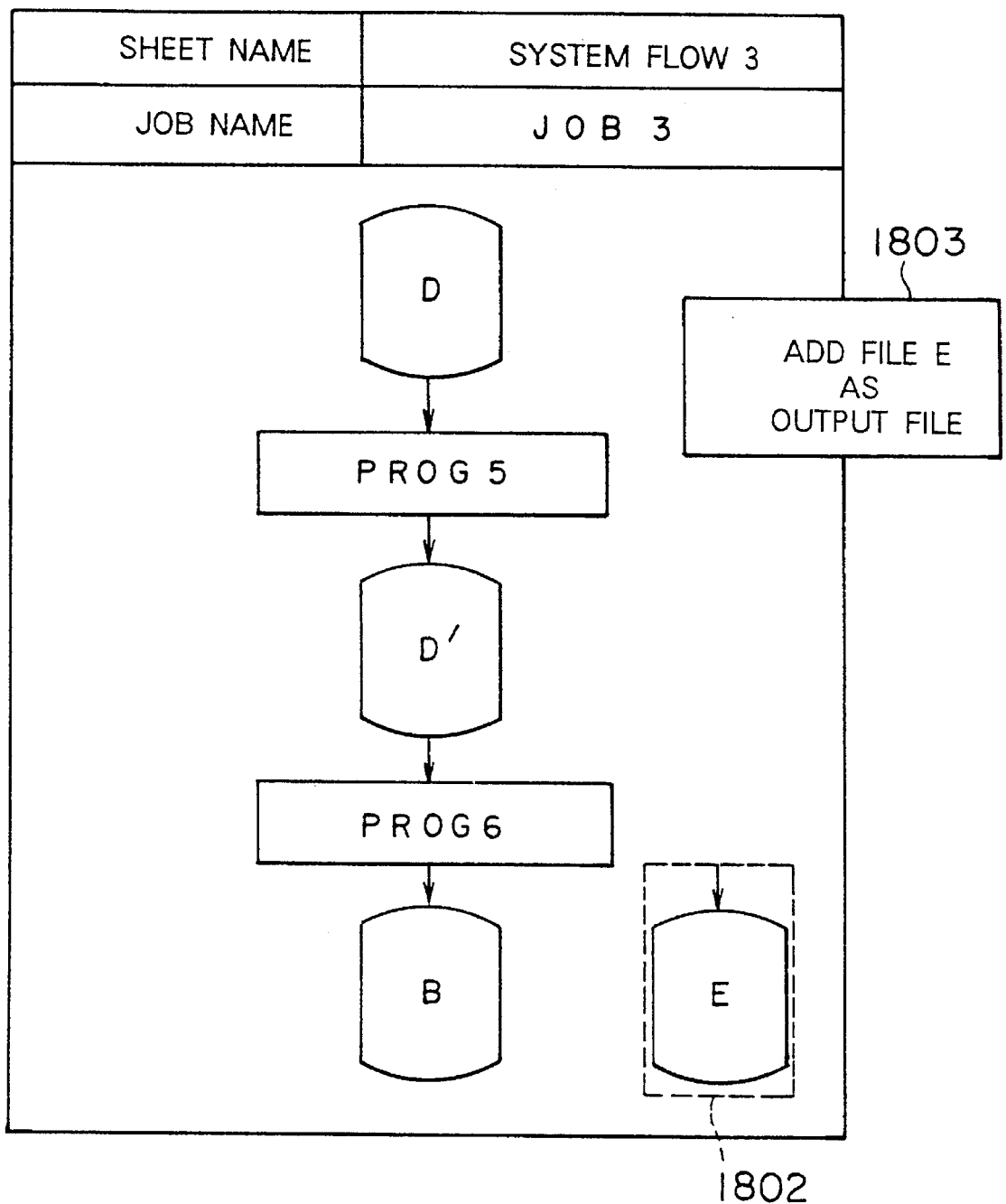
Figure 18C:
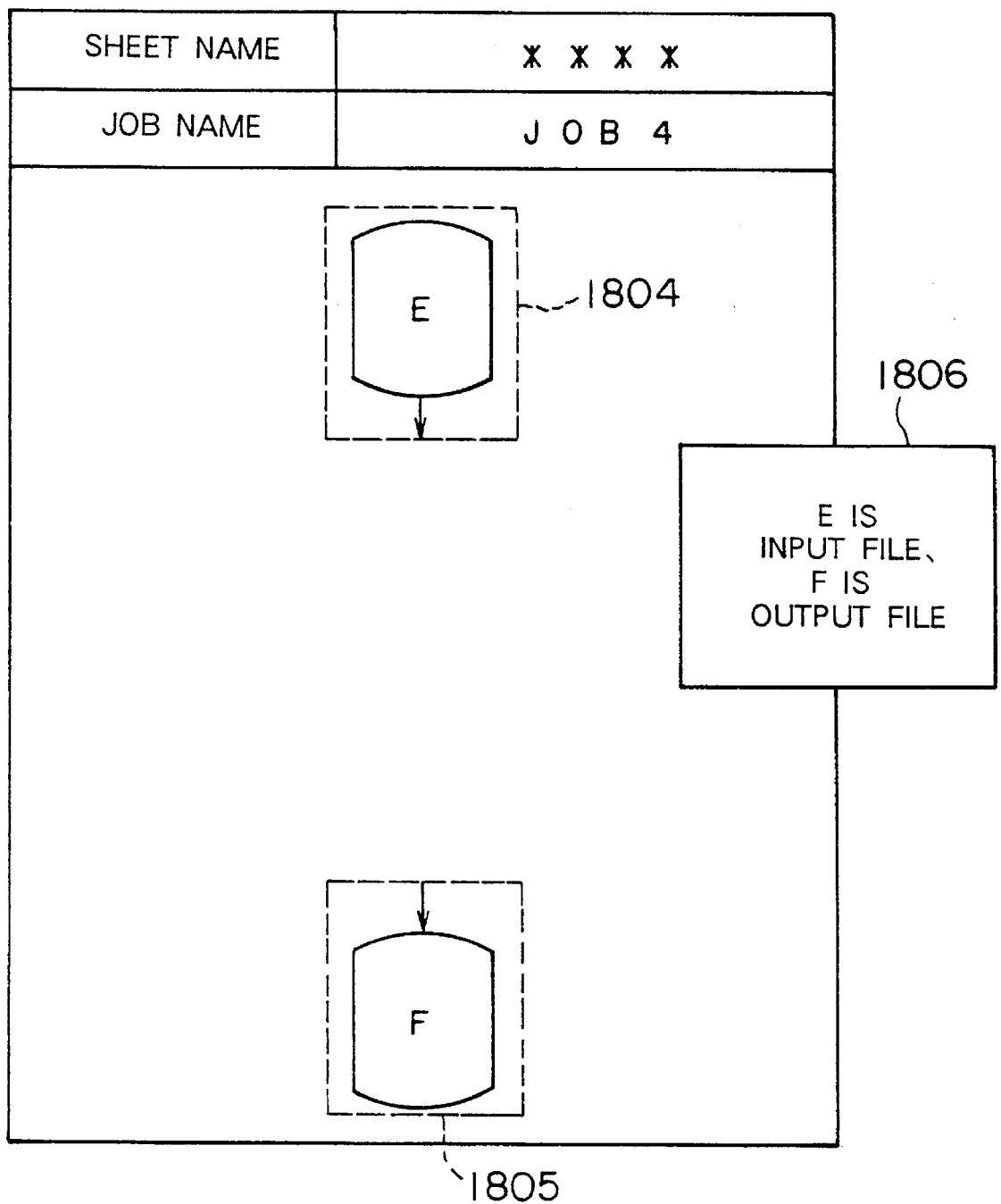

FIGS. 18A to 18C show examples of changed lower level software products and remarks indicating no change or a change field.

The present embodiment will be described with reference to FIGS. 17 and 18, using by way of example the lower level software product reuse/change field information shown in FIG. 12.

First, for the job name "JOB 1" in the job name field 1203 in FIG. 12, derived from the lower level software products 301 in FIG. 17 is a system flow specification having the same system flow name "SYSTEM FLOW 1" in the system flow name field 1204 on the same row as the job name "JOB 1". Then, a message "Unnecessary for Change" representing the same meaning as "Reuse with No Change" in the reusability field for the job name "JOB 1" shown in FIG. 12 is outputted to the changed lower level software product 1702. Namely, the message is added to the system flow specification for the system name "SYSTEM FLOW 1" derived from the lower level software products 301, and outputted to the changed lower level software product 1702.

FIG. 18A shows an example of the system flow specification for the system flow name "SYSTEM FLOW 1" together with the added message 1801.

Similarly, for the job name "JOB 3" in FIG. 12, derived from the lower level software products is a system flow specification having the same system flow name "SYSTEM FLOW 3" on the same row as the job name "JOB 3". Since the reusability field in FIG. 12 indicates "Add Output File E", an output file "E" is added to the derived system flow specification, as indicated at 1802 in FIG. 18B. At the same, a message representing a change is described and added to the changed lower level software product. FIG. 18B shows an example of the changed lower level software product.

Similarly, in the case of the job name "JOB 4" in FIG. 12, the system flow name "***" and reusability "New Generation" on the same row indicate that the lower level software products 301 shown in FIG. 17 do not contain the corresponding lower level software product. Therefore, the input file shown in the reusability field in FIG. 12 is generated with the file name "E" being given as indicated at 1804 in FIG. 18C, and the output file is generated with the file name "F" as indicated at 1805 in FIG. 18C. At the same time, a message 1806 indicating new generation is outputted to the changed lower level software product. FIG. 18C** shows an example of the changed software product.

According to this embodiment, when an upper level software product generated in reversal from already existing lower level software products is changed, it is possible to semi-automatically generated a lower level software product corresponding to the changed upper level software product, thereby allowing to reuse lower level software products generated upon changing the upper level software product.

Figure 20:
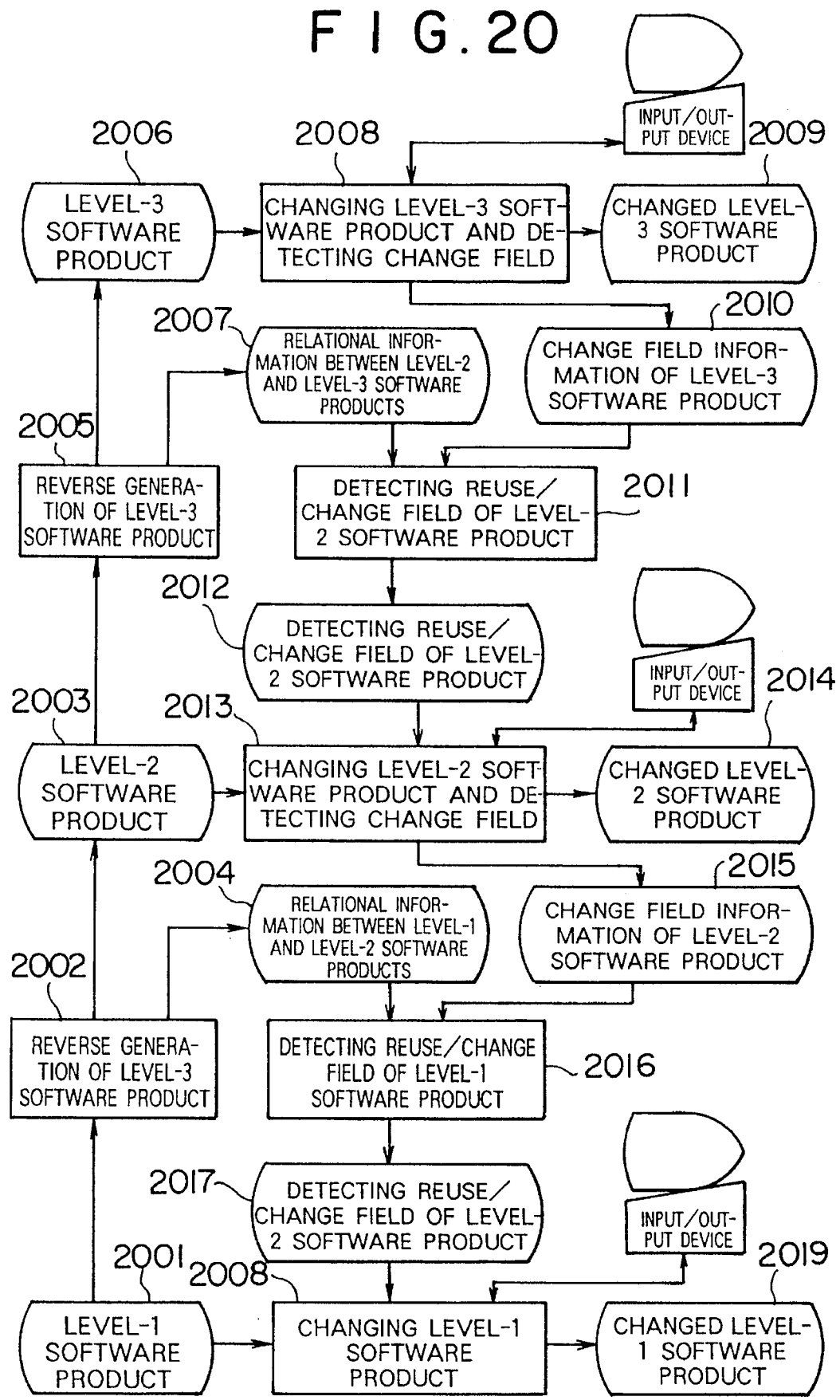
FIG. 20 is a functional block diagram of the software illustrated in FIG. 19.

FIG. 19 is a flow chart showing the procedure of a software reuse supporting method according to a fourth embodiment of the present invention, and FIG. 20 is a functional block diagram realizing the function to be executed by the method shown in FIG. 19.

In this embodiment, the third embodiment is modified to use it in a multi-level fashion. In FIGS. 19 and 20, three-level software products are processed.

Figure 21:
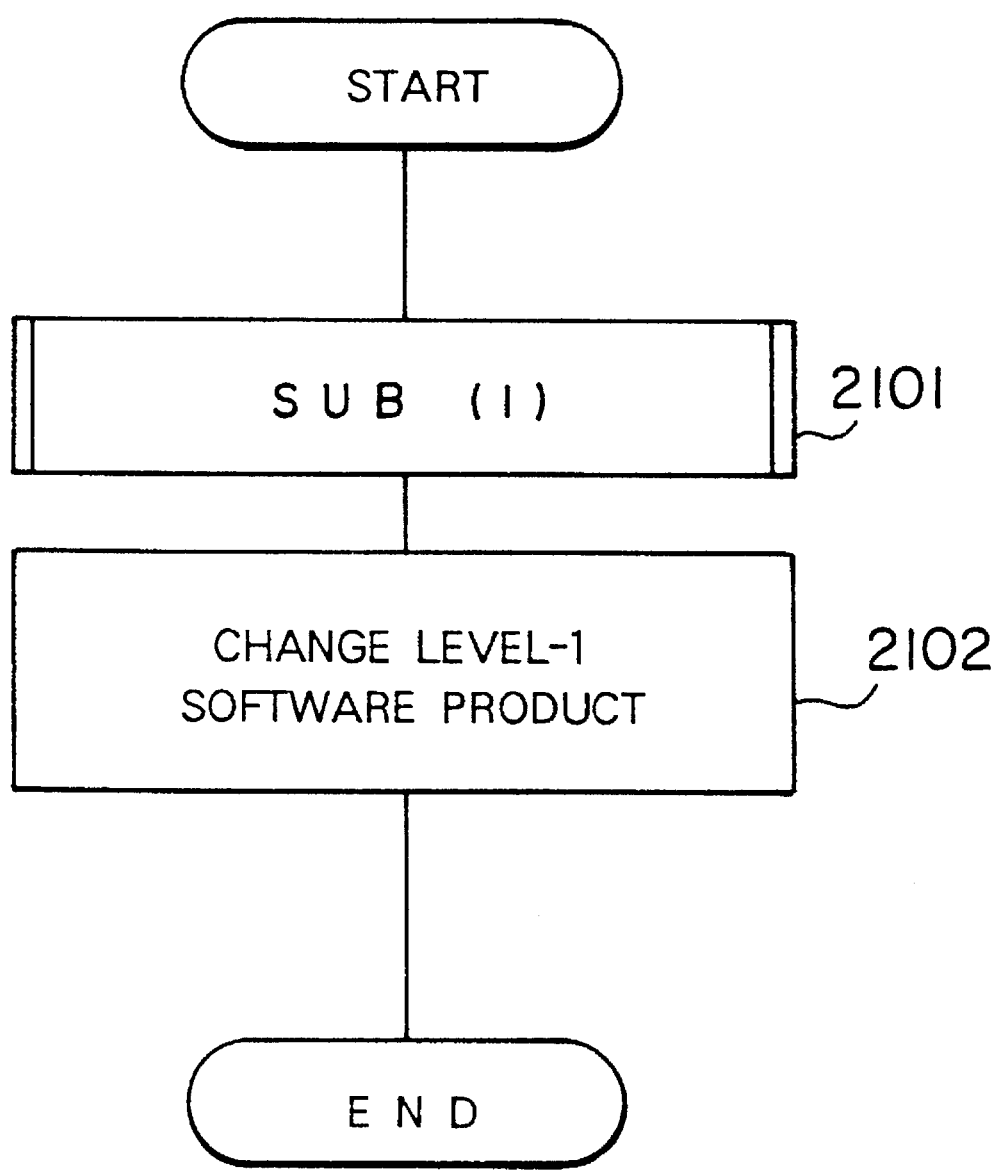
FIGS. 21 to 22 are flow charts showing the procedures to be executed by the third embodiment when it is operated in a multi-level fashion.

FIG. 21 is a flow chart showing the procedure for a multi-level. The flow chart shown in FIG. 22 is called from the flow chart of FIG. 21, the flow chart in FIG. 22 has a parameter x representative of the number of levels.

Figure 22:
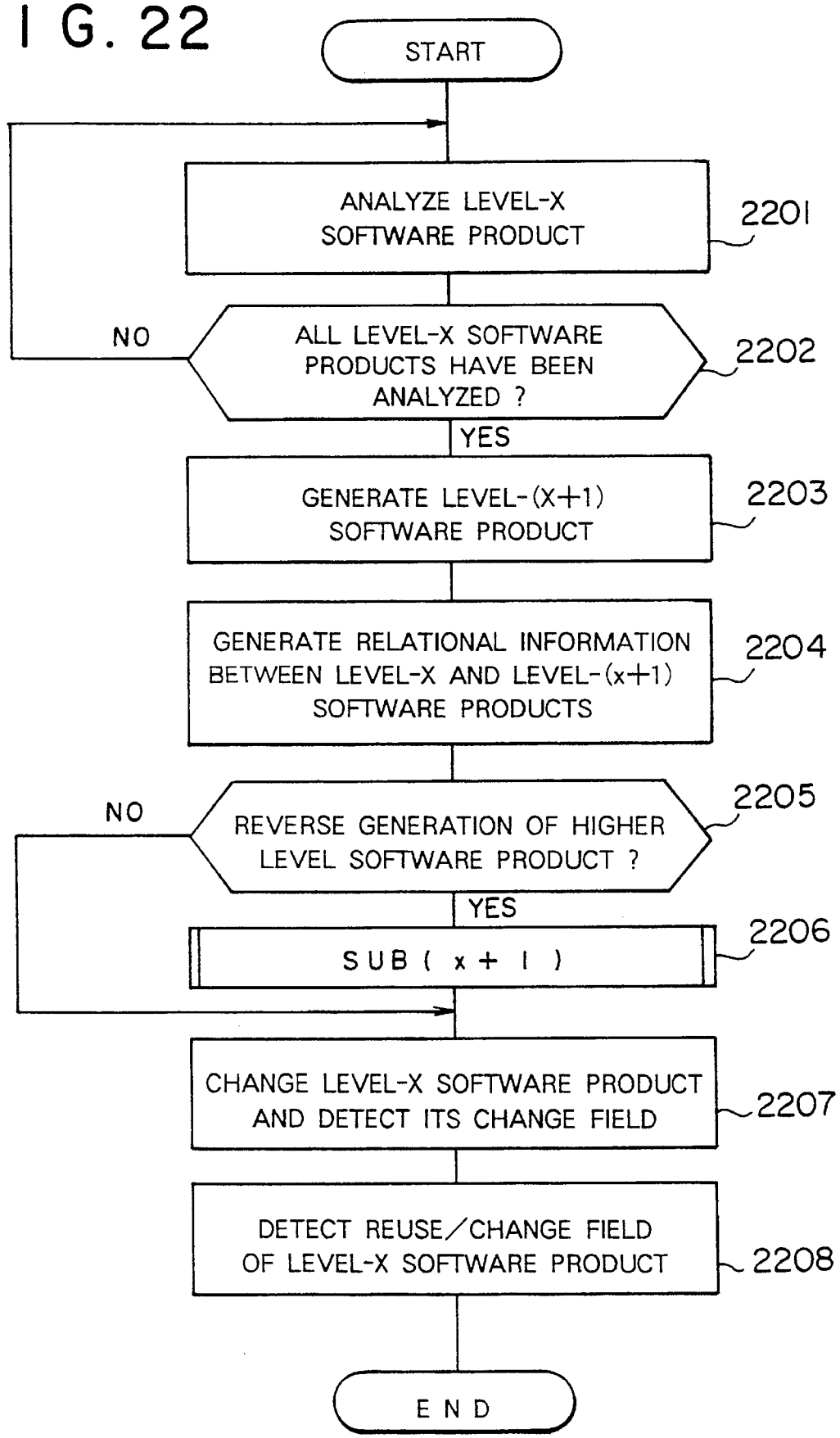

SUB (1) shown in FIG. 21 is representative of all processes shown in FIG. 22. The processes includes a step of generating in reversal a level-x software product, a step of generating relational information between level-x and level-(x+1) software products, a step of changing a level-(x+1) software product and detecting a change field, and a step of detecting a reuse/change field of a level-x software product (these steps corresponding to step 2101).

Since a process of changing the lowest level, or level-1, software product, is not performed by SUB 91), it is changed at step 2102.

Referring to FIG. 22, a level-x software product is analyzed (step 2201). If all level-x software products have been analyzed (step 2202), a level-(x+1) software product is generated (step 2203), and relational information is generated between the level-x software products and level-(x+1) software product (step 2204). It is checked whether an upper level software product is further generated in reversal (step 2205). If an upper level software product is further generated, the above steps are repeated (step 2206). Thereafter, there are executed a step of changing the level-x software product and detecting a change field (step 2207) and a step of detecting a reuse/change field of the level-x software product (step 2208).

A desired number of levels is possible using the flow charts shown in FIGS. 21 and 22.

In FIGS. 19 and 20, it is assumed that a level-2 software product is at higher level than a level-1 software product, and that a level-3 software product is at higher level than a level-2 software product.

At the reverse generation step 2002, the level-1 software product 2001 is analyzed (step 1901 in FIG. 19). It is checked whether all level-1 software products 2002 have been analyzed (step 1902 in FIG. 19). If not, analyzing the level-1 software products 2001 is repeated (step 1901 in FIG. 19). If all the products have been analyzed, a level-2 software product 2003 is generated (step 1903 in FIG. 19), and at the same time there is generated relational information 2004 between the level-1 software product and level-2 software product 2003 (step 1904 in FIG. 19). The process of generating the level-2 software product (step 1903 in FIG.

19) is executed before, or at the same time, the software product relational information is generated (step 1904 in FIG. 19).

Next, at the reverse generation step 2005, the level-2 software product 2003 is analyzed (step 1905 in FIG. 19). It is checked whether all level-2 software products 2003 have been analyzed (step 1906 in FIG. 19). If not, analyzing the level-2 software products 2001 is repeated. If all the products have been analyzed, a level-3 software product 2006 is generated (step 1907 in FIG. 19), and at the same time there is generated relational information 2006 between the level-2 software product 2003 and level-3 software product 2006 (step 1908 in FIG. 19).

The process of generating the level-3 software product (step 1907 in FIG. 19) is executed before, or at the same time, the software product relational information is generated (step 1908 in FIG. 19).

At the step 2008 of changing the level-3 software product and detecting a change field, there are executed a step of generating a changed level-3 software product 2009 from the level-3 software product 2006 and a step of detecting change field information 2010 of the level-3 software product 2006 (step 1909 in FIG. 19).

At a step 2011 of detecting a reuse/change field for the level-2 software product, there is detected a reuse/change field of the level-2 software product in accordance with the level-3 software change field information 2010 and relational information 2007 between the level-2 software product and level-3 software product (step 1910 in FIG. 19), and there is generated reuse/change field information 2015 of the level-2 software product.

At the step 2013 of changing the level-2 software product and detecting a change field, there are executed a step of generating a changed level-2 software product 2014 from the level-2 software product 2003 by using the level-2 reuse/change information 2012 and a step of detecting change field information 2015 of the level-2 software product 2015 (step 1911 in FIG. 19).

At a step 2017 of detecting a reuse/change field for the level-1 software product, there is detected a reuse/change field of the level-1 software product in accordance with the level-2 software change field information 2015 and relational information 2004 between the level-1 software product and level-2 software product (step 1912 in FIG. 19), and there is generated reuse/change field information 2017 of the level-1 software product.

Lastly, at a step 2018 of changing a level-1 software product, there is executed a step of generating a changed level-1 software product 2019 from the level-1 software product 2001 using the level-1 reuse/change field information 2017 (step 1923 in FIG. 19).

Figure 23A:
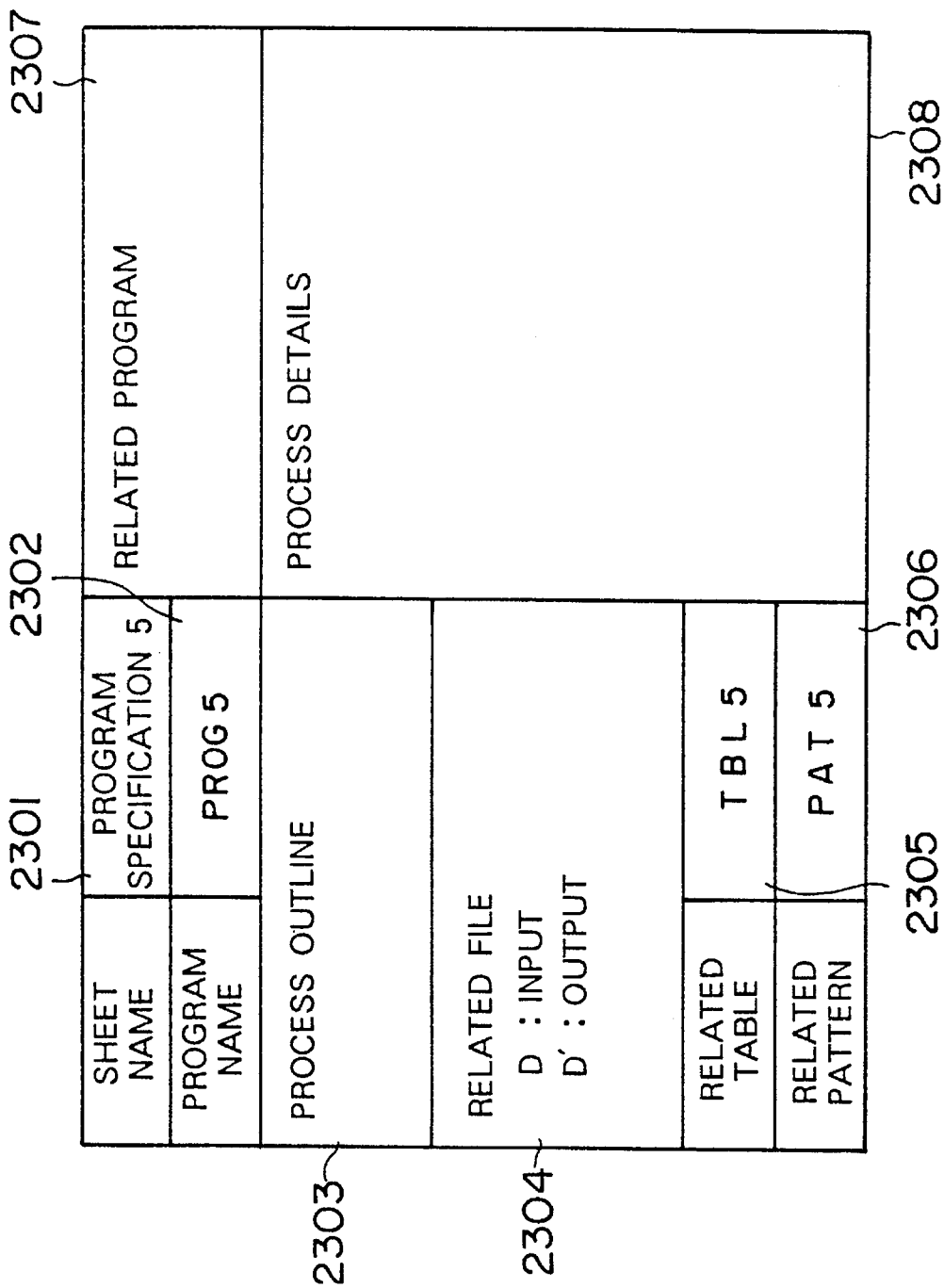

FIGS. 23A and 23B show examples of level-1 software products which are program specifications in this case.

The level-1 software product 2001 shown in FIG. 20 includes program input/output files, program patterns, and the like (hereinafter called a program specification).

The program specification includes a sheet name field 2301, program name field 2302, process outline field 2303, related file field 2304, related table field 2305, related pattern field, 2306, related program field 2307, and process details field 2308.

Within the sheet name field 2301, a particular sheet name of the program specification is displayed. Within the program name field 2302, a program name used by the program specification is displayed. Within the process outline field 2303, a process outline is described. With the related file field 2304, there are displayed an input/output file name and input/output attribute for the program identified by the program name in the program name field 2302. Within the related table field 2305, a particular table name used for the program is displayed. Within the related pattern field 2306, a particular pattern name used for the program in the program specification. Within the related program field 2307, a particular program name associated the program in the program specification is described. Within the process details field 2308, the details of a process is described.

FIGS. 24A and 24B show examples of analyzed information of the program specification.

The program specification analyzed information is the information of an analyzed program specification while paying attention to program input/output files. As shown in FIGS. 24A and 24B, the program specification analyzed information includes a sheet name field 2401, program name field 2402, file name field 2403, and file attribute field 2404.

In the sheet name field 2401, there is stored a particular sheet name of the program specification. In the program name field 2402, there is stored a particular program name of the program specification. In the program name field 2403, there is stored a particular input/output file name for the program identified by the program name in the program name field 2402. In the fine attribute field 2404, there is stored in a particular input/output file attribute for the file whose name is stored in the fine name field on the same row.

At the step 1901 shown in FIG. 19, the level-1 software product or software specification is analyzed while paying attention to the input/output files of the program. Specifically, the sheet name in the sheet name field 2301 shown in FIG. 23 is entered in the sheet name field 2401 shown in FIG. 24, the name in the program name field 2302 is entered in the program name field 2402. The file name in the related file field 2304 is entered in the fine name field 2403. The file attribute in the related file field 2304 is entered in the attribute field 2404.

In this manner, at the step 1901, the analyzed information shown in FIGS. 24A and 24B are generated respectively from FIG. 23A and 23B.

At the step 1903, the program name, file name, and file attribute are extracted from FIGS. 24A and 24B to thereby generate in reversal a system flow specification shown in FIG. 4A. FIGS. 4A to 4C show examples of system flow specifications for the level-2 software product 203. The system flow specifications shown in FIGS. 4B and 4C are also generated in reversal at the step 1903.

Figure 25:
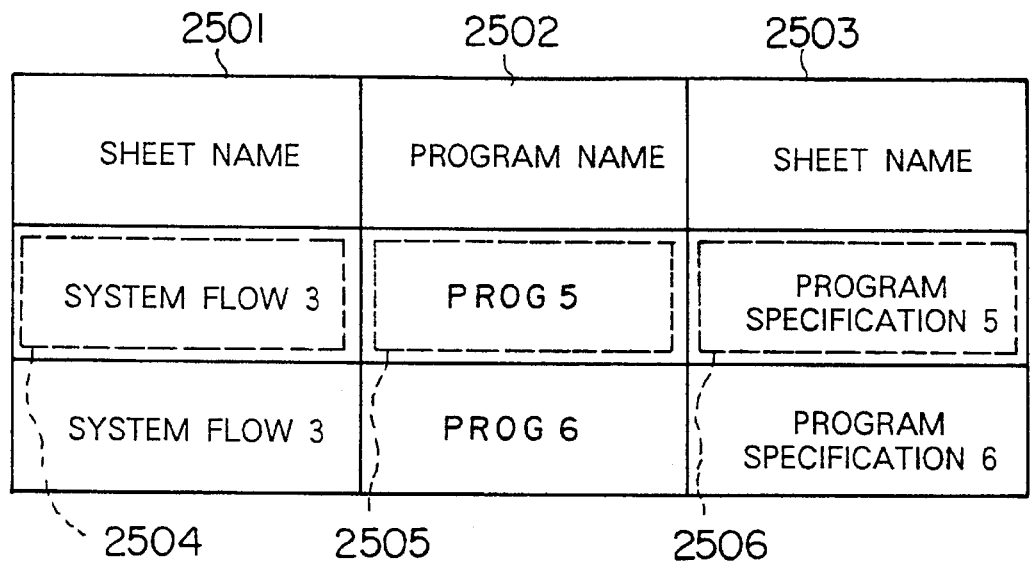
FIG. 25 shows an example of relational information between the program specification and the system flow specification.

FIG. 25 shows an example of relational information between the level-1 software product and level-2 software product, in this case, between a program specification and system flow specification.

Specifically, the relational information includes two sets of sheet name fields 2501 and 2503, and a set of program name fields 2502. In the sheet name field 2501, there is stored a particular sheet name of the system flow specification (level-2 software product). In the program name field 2502, there is stored a particular program name in the system flow specification. In the sheet name field 2503, there is stored a particular sheet name of the system flow specification identified by the system flow name specification stored in the sheet name field 2501 on the same row. In other words, there is stored the sheet name of the program specification which described in detail the programs identified by the program name in the program name field 2502 on the same row.

At step 1903 in FIG. 19 the level-2 system flow specification is generated, and at the step 1904 the relational information between the level-1 program specification and the level-2 system flow specification. At the step 1903, the name a user inputted is stored in the sheet name field 2501, the name stored in the program name field 2402 in the analyzed information of the program specification is stored in the program name field 2502, The sheet name stored in the sheet name field 2402 in the analyzed information of the program specification is stored in the sheet name field 2503. For example, the program name "Prog 5" (2405) is stored as the program name "Prog 5" (2505), and the sheet name "Program Specification 5" (2406) is stored as the sheet name "Program Specification 5" (2506).

Returning back to FIGS. 7 to 12, the present embodiment will be described in connection with these Figures. FIG. 7 shows a data flow specification which is an example of the level-3 software product 2006 shown in FIG. 20. FIG. 8 shows relational information between software products which is an example of the relational information 2007 between the level-2 and level-3 software products.

FIG. 9 shows a data flow specification modified from FIG. 7 which is an example of the changed level-3 software product 2009.

FIG. 10 shows data flow specification change field information which is an example of the level-3 software product change field information 2010.

FIG. 12 shows system flow specification reuse/change field information which is an example of the level-2 software product reuse/change field information 2012.

The steps 1905 to 1910 in FIG. 19 for the level-2 software specification or system flow specification, and the level-3 software specification or data flow specification, have already described with the foregoing embodiment.

Figure 26:
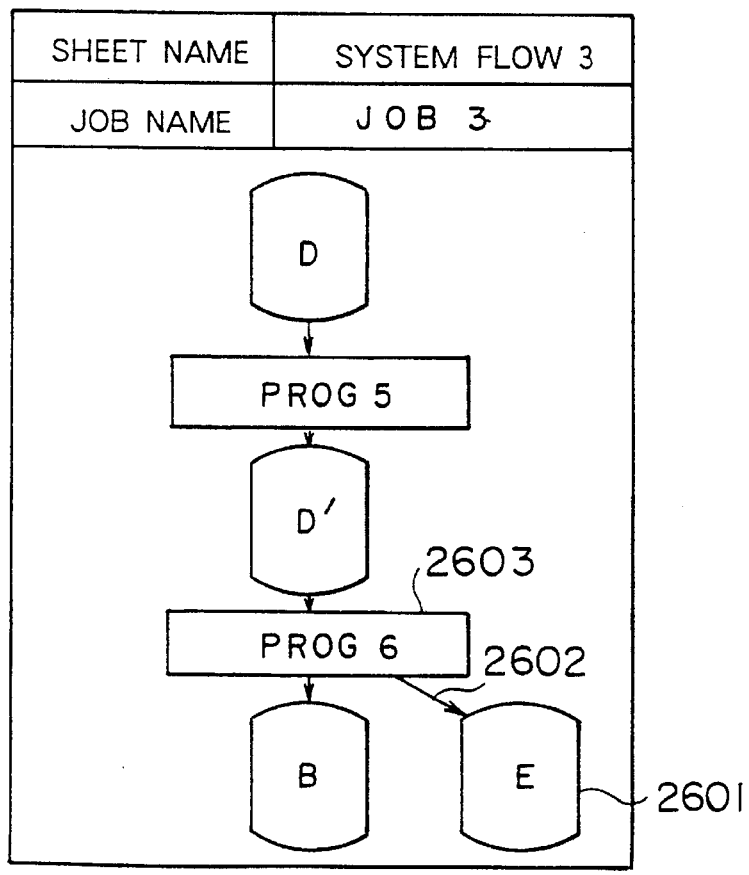
FIG. 26 shows a system flow specification obtained by changing the system flow specification shown in FIG. 4A.

FIG. 26 shows an example of the changed level-2 software product obtained after the step of changing a level-2 software product and detecting a change field.

Namely, FIG. 26 shows the changed level-2 system flow specification obtained from the system flow specification shown in FIG. 4C at the step 2013 shown in FIG. 20. In this case, by using the reuse/change of the system flow information 3 shown in FIG. 12, an output file "E" is added.

At the step 1911 shown in FIG. 19, an operator instructs by using the input device 13 and display device 14 to add a box 2601 representative of a file and an arrow 2602 from a program box 2603 to the file box 2601, to the system flow specification of FIG. 4A.

Figure 27:
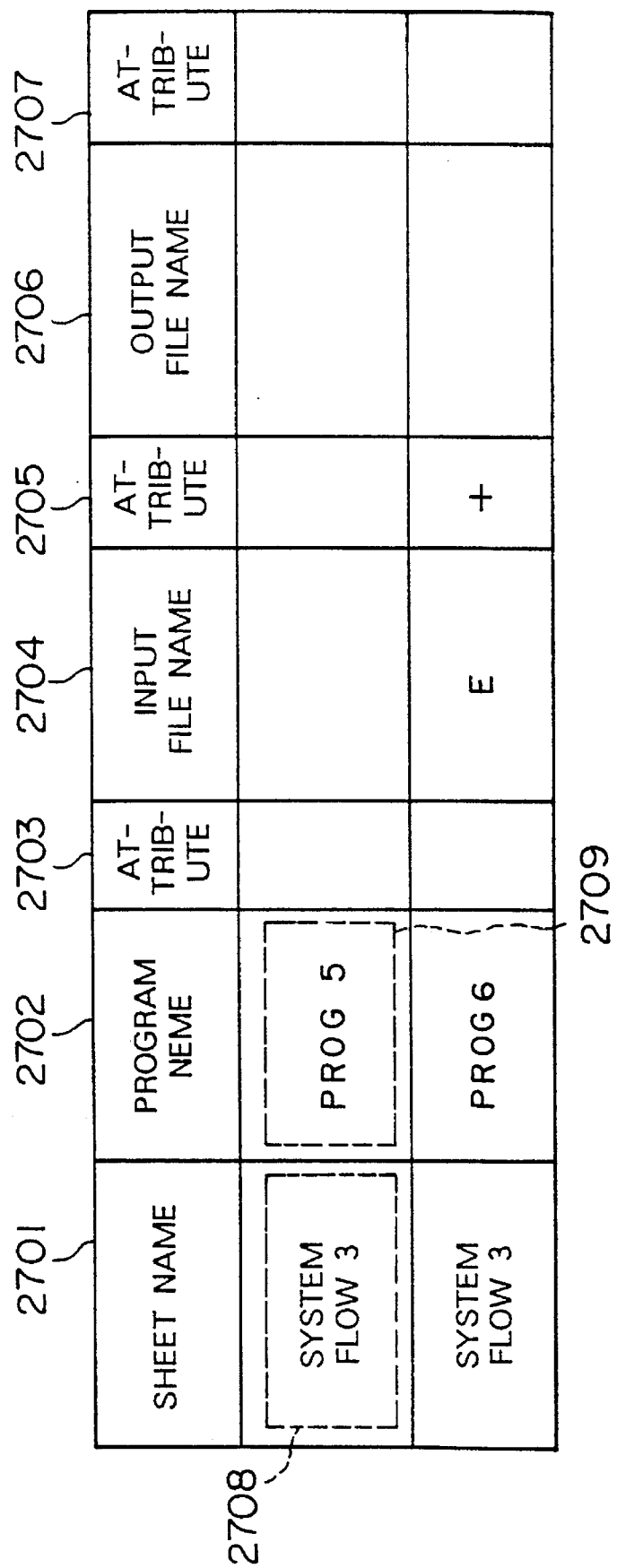
FIG. 27 shows an example of reuse information of the system flow specification.

FIG. 27 shows an example of the level-2 software product change field information obtained at the step 2013.

The level-2 software product change information includes a sheet name field 2701, program name field 2702, program attribute field 2703, input file name field 2704, input file attribute field 2705, output file name field 2706, and output file attribute field 2707.

In the sheet name field 2701, there is stored a particular sheet name of the system flow specification for the level-2 software product. In the program name field 2702, there is stored a particular program name described in the system flow specification. In the program attribute name field 2703, there is stored a flag representative of addition/deletion of the program identified by the program name on the same row. In the input file name field 2704, there is stored a particular name of an input file for the program identified by the program name on the same row. In the input file attribute field 2705, there is stored a flag representative of addition/ deletion of the file identified by the input file name on the same row. In the output file name field 2706, there is stored a particular name of an output file for the program identified by the program name on the same row. In the output file attribute field 2707, there is stored a flag representative of addition/deletion of the file identified by the output file name on the same row. In the attribute fields 2703, 2705, and 2707, a plus symbol "+" represents addition, a minus symbol "−" represents deletion, and a blank " " represents no change.

At the step 1911 shown in FIG. 19, at the same time the system flow specification is changed, the change field information is generated. For example, a user instructs to add an output file for a program, the output file name is entered in the output file name field 2706 and the plus symbol "+" is entered in the attribute field 2707.

Figure 28:
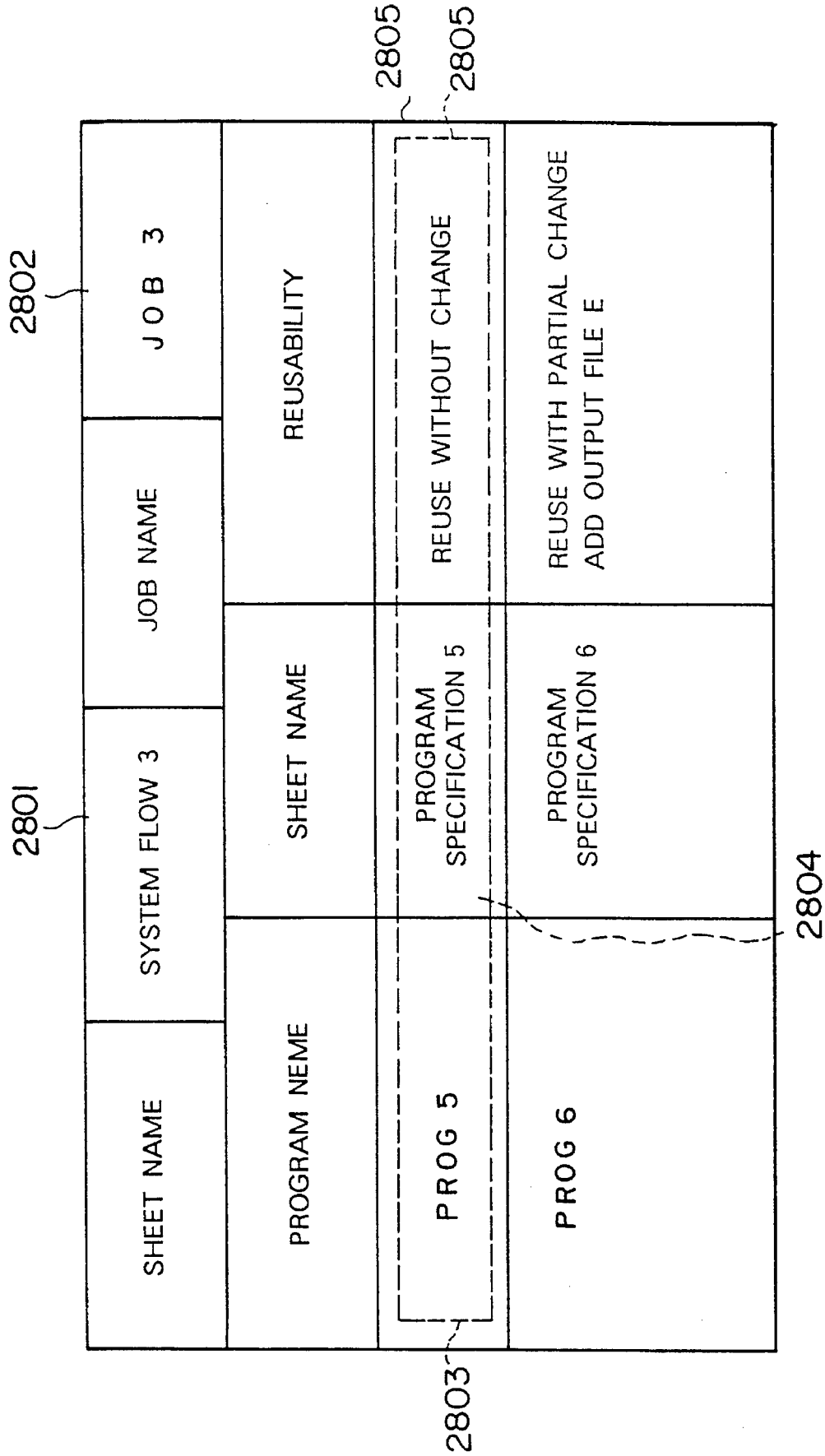
FIG. 28 shows an example of reuse information of the system flow specification.

FIG. 28 shows an example the level-1 software product reuse/change field information obtained at the step 2017 shown in FIG. 20.

The reuse/change field information of a program specification (level-1 software product) includes a sheet name field 2801, job name field 2802, program name field 2803, program specification name field 2804, and reusability field 2805.

Within the sheet name field 2801, there is displayed a particular sheet name of a system flow specification generated in reversal from program specifications to be reused. Within the job name field 2802, there is displayed a particular job name of the system flow specification. Within the program name field 2803, there is displayed a particular program name in the changed system flow specification (refer to FIG. 10). Within the program specification name field 2804, there is displayed a particular name of a detailed program obtained from the program identified by the program name on the same row. In the reusability field 2805, there is displayed information on reusability or new generation of the program specification on the same row. The reusability fields in this case indicate that the sheet name "Program Specification 5" can be reused without any change, and that the sheet name "Program Specification 6" can be used by inserting an output file "E" at a proper position.

At the step 2016 of detecting the level-1 software product reuse/change field shown in FIG. 20, the reuse/change field information shown in FIG. 28 is generated in accordance with the system flow (level-2 software product) change information (refer to FIG. 27) and the relational information between the system flow and program specifications or between software products (refer to FIG. 25). For example, for the program name 2709 of the system name "SYSTEM FLOW 3" shown in FIG. 27, it can be judged from blanks in all the remaining fields that the system flow 3 can be reused without any change. Furthermore, the sheet name for the program name "prog 5" (2505) and sheet name "SYSTEM FLOW 3" (2504) in FIG. 25 can be judged as the "Program Specification 5" (2506), so the indication "Reuse without Change" (2806) is entered as shown in FIG. 28.

FIGS. 29A and 29B show program specifications obtained after generating the program specification reuse/change field information of FIG. 28.

A message 2901 shown in FIG. 29A indicates that the program specification shown in FIG. 24A is not necessary to be changed. A message 2902 in FIG. 29B indicates that a program output file "E" is automatically added to the program specification shown in FIG. 24B and that a user is required to change other necessary portions.

At the step 1910 shown in FIG. 19, a user enters information while considering the messages 2901 and 2902 to change the program specifications shown in FIGS. 29A and 29B.

According to this embodiment, multi-level software products from upper level to lower level can be developed efficiently and collectively while using lower level software products. Therefore, a new software product can be efficiently developed while using already existing software products.

We claim:

1. A reverse engineering method of supporting software reuse in generating an upper level software product from a lower level software product by reusing some software product among multi-level software products ranging from an upper level data flow to a lower level job flow, comprising the steps of:

inputting a plurality of lower level software products each having a job name, at least one program name, at least one file name, and at least one arrow connecting said at least one program name with said at least one file name;

generating an upper level software product having program names, file names, and arrows connecting said program names and file names of a plurality of lower level software products, said lower level software products connected to one another at a place where there is a common file name in any of the plurality of lower level software products, said upper level software product having a sheet name;

generating relational information including the same sheet name and job names included in any of said connected plurality of lower level software products;

displaying said upper level software product on an input/output interface;

inputting a request for changing a part of said upper level software product via said input/output interface;

changing said part of said upper level software product displayed on said input/output interface in response to said change request;

detecting information of a sheet name and a job name representing a reusable field of said lower level software product included in said upper level software product not changed in said changing step and detecting information of a sheet name and a job name corresponding to a content which was changed in said changing step, in response to a change of said upper level software product; and providing a user with the detected information with the sheet names and the job names by outputting the detected information to a printer or screen.

2. A method according to claim 1 wherein the step of generating relational information between the lower and upper level software products takes place during a same time period as the step of generating the upper level software product from the lower level software product.

3. A method according to claim 1, wherein a pair of said lower level software product and said upper level software product is at least one of a pair of an internal design and an external design higher in level than coded programs and a pair of an external design and detailed requirements a user supplied.

4. A method according to claim 1 further comprising:

comparing said upper level software product as said upper level software product existed before the changing step and as said upper level software product exists after the changing step to detect the content.

5. A method according to claim 1 further comprising the steps of changing said lower level software product corresponding to the content changed in the changed upper level software product when there is the corresponding lower level software product and the content to be changed, and producing a lower level software product corresponding to the changed upper level software product when there is not the corresponding lower level software product and there is only the content to be changed.

6. A method according to claim 1 further comprising a step of storing in a memory, responsive to said change of said upper level software product, a name of a file in said upper level software product, and file information designating one of deletion, addition and no change of said file according to the name.

7. A reverse engineering method of supporting software reuse in generating an upper level software product from a lower level software product by reusing some software product among multi-level software products ranging from an upper level data flow to a lower level job flow, comprising the steps of:

means for inputting a plurality of lower level software products each having a job name, at least one program name, at least one file name, and at least one arrow connecting said at least one program name with said at least one file name;

means for generating an upper level software product having program names, file names, and arrows connecting said program names and file names of a plurality of lower level software products, the lower level software products connected to one another at a place where there is a common file name in any of said plurality of lower level software products, said upper level software product having a sheet name;

means for generating relational information including same sheet name and job names included in any of said connected plurality of lower level software products;

means for displaying said upper level software product on an input/output interface;

means for inputting a request for changing a part of said upper level software product via said input/output interface;

means for changing said part of said upper level software product displayed on said input/output interface in response to said change request;

means for detecting information of a sheet name and a job name representing a reusable field of said lower level software product included in said upper level software product not changed in said changing step and detecting information of a sheet name and a job name corresponding to a content which was changed in said changing step, in response to a change of said upper level software product; and means for providing a user with the detected information with the sheet names and job names by outputting the detected information to a printer or screen.

8. An apparatus according to claim 7 wherein the means for generating relational information between said lower and upper level products is configured to operate during a same time period as the means for generating the upper level software product using the lower level software product.

9. An apparatus according to claim 7 further comprising means for storing, responsive to said change of said upper level software product, a name of a file in said upper level software product, and file information designating of one of deletion, addition, and no change of said file according to the name.

* * * * *